US006876971B1

(12) United States Patent
Burke

(10) Patent No.: US 6,876,971 B1
(45) Date of Patent: Apr. 5, 2005

(54) FUNDS DISTRIBUTION SYSTEM CONNECTED WITH POINT OF SALE TRANSACTION

(75) Inventor: Bertram V. Burke, Sea Bright, NJ (US)

(73) Assignee: Every Penny Counts, Inc., Cape Coral, FL (US)

( * ) Notice: Subject to any disclaimer, the term of this patent is extended or adjusted under 35 U.S.C. 154(b) by 608 days.

(21) Appl. No.: 09/609,777

(22) Filed: Jul. 5, 2000

(51) Int. Cl.[7] .............................................. G06F 17/60
(52) U.S. Cl. ......................................................... 705/1
(58) Field of Search ............................................ 705/1

(56) References Cited

U.S. PATENT DOCUMENTS

| | | | |
|---|---|---|---|
| 3,833,885 A | | 9/1974 | Gentile et al. |
| 4,355,369 A | | 10/1982 | Garvin |
| 4,607,335 A | | 8/1986 | Mizuno |
| 4,673,802 A | | 6/1987 | Ohmae et al. |
| 4,941,090 A | | 7/1990 | McCarthy |
| 5,111,395 A | | 5/1992 | Smith et al. |
| 5,117,355 A | | 5/1992 | McCarthy |
| 5,202,826 A | | 4/1993 | McCarthy |
| 5,220,501 A | | 6/1993 | Lawlor et al. |
| 5,253,345 A | | 10/1993 | Fernandes et al. |
| 5,287,268 A | * | 2/1994 | McCarthy ..................... 705/14 |
| 5,302,811 A | * | 4/1994 | Fukatsu ....................... 235/380 |
| 5,339,239 A | | 8/1994 | Manabe et al. |
| 5,383,113 A | | 1/1995 | Kight et al. |
| 5,466,919 A | * | 11/1995 | Hovakimian .................. 705/17 |
| 5,475,585 A | | 12/1995 | Bush |
| 5,506,393 A | | 4/1996 | Ziarno |
| 5,546,303 A | | 8/1996 | Helbling |
| 5,555,497 A | * | 9/1996 | Helbling ....................... 705/14 |
| 5,564,546 A | | 10/1996 | Molbak et al. |
| 5,621,640 A | | 4/1997 | Burke |
| 5,696,366 A | * | 12/1997 | Ziarno ......................... 235/380 |
| 5,724,518 A | * | 3/1998 | Helbling ........................ 705/1 |
| RE36,116 E | | 2/1999 | McCarthy |
| 5,887,273 A | * | 3/1999 | Ziarno .......................... 705/39 |
| 5,905,246 A | | 5/1999 | Fajkowski |
| 5,909,794 A | * | 6/1999 | Molbak et al. .............. 194/216 |
| 5,970,480 A | | 10/1999 | Kalina |
| 6,052,674 A | | 4/2000 | Zervides et al. |
| 6,088,682 A | | 7/2000 | Burke |
| 6,112,191 A | | 8/2000 | Burke |

FOREIGN PATENT DOCUMENTS

EP         623235 A1  * 11/1994    ........... B42D/15/10

OTHER PUBLICATIONS

"Children's Educ Fund: America's Elementary Schools Benefit from Children's Education Fund," Business Wire, Nov. 2, 1990.*

"Kaneb Services: Kaneb Introduces VIATA Subsidiary; VIATA Offers Uniqu Point–of–Sale Services," Business Wire, Jun. 27, 1991.*

(Continued)

*Primary Examiner*—Jonathan Ouellette
(74) *Attorney, Agent, or Firm*—Leo Stanger

(57) ABSTRACT

An automated way for sales establishments to extend point of sale (POS) cash transactions to allow consumers to save change or transfer discretionary funds into saving or donating accounts managed by a central clearinghouse. The system includes a network composed of consumers/payors with identification cards, neutral merchants who enter data and funds into remote POS terminals, central clearinghouse that offers/process accounts, and service providers for participating consumer/account holders, i.e. nonprofit giving, travel, mutual funds, savings, ets. The network provides consumers with a seamless, convenient, and painless way to save/donate every time they spend at multiple POS counter locations.

44 Claims, 30 Drawing Sheets

OTHER PUBLICATIONS

Eisman, Regina, "Sweet Charity," Incentive, v166n12, PP: 24–29, Dec. 1992.*

"Winn–Dixie and the Salvation Army Team Up to Fight Hunger Across the Sunbelt," PR Newswire, Jan. 19, 1989.*

Kutler, Jeffrey, "MasterCard and Visa Making Progress: In Developing Point–of–Sale Networks," American Banker, p. 1, vol. 153, No. 13, Jan. 20, 1988.*

"Charity at the Checkout Nob Hill Markets Have Led the Way in Collecting Fund to Help Feed the Needy," San Jose Mercury News (SJ), Oct. 11, 1988.*

"Concern for the Hungry Registered at Winn–Dixie," Supermarket News, p22, Jan. 22, 1990.*

"Contributor's Brochure: Combined Federal Campaign", 1990, pp 12–15.

* cited by examiner

Transaction Card

DC 1

DC 2

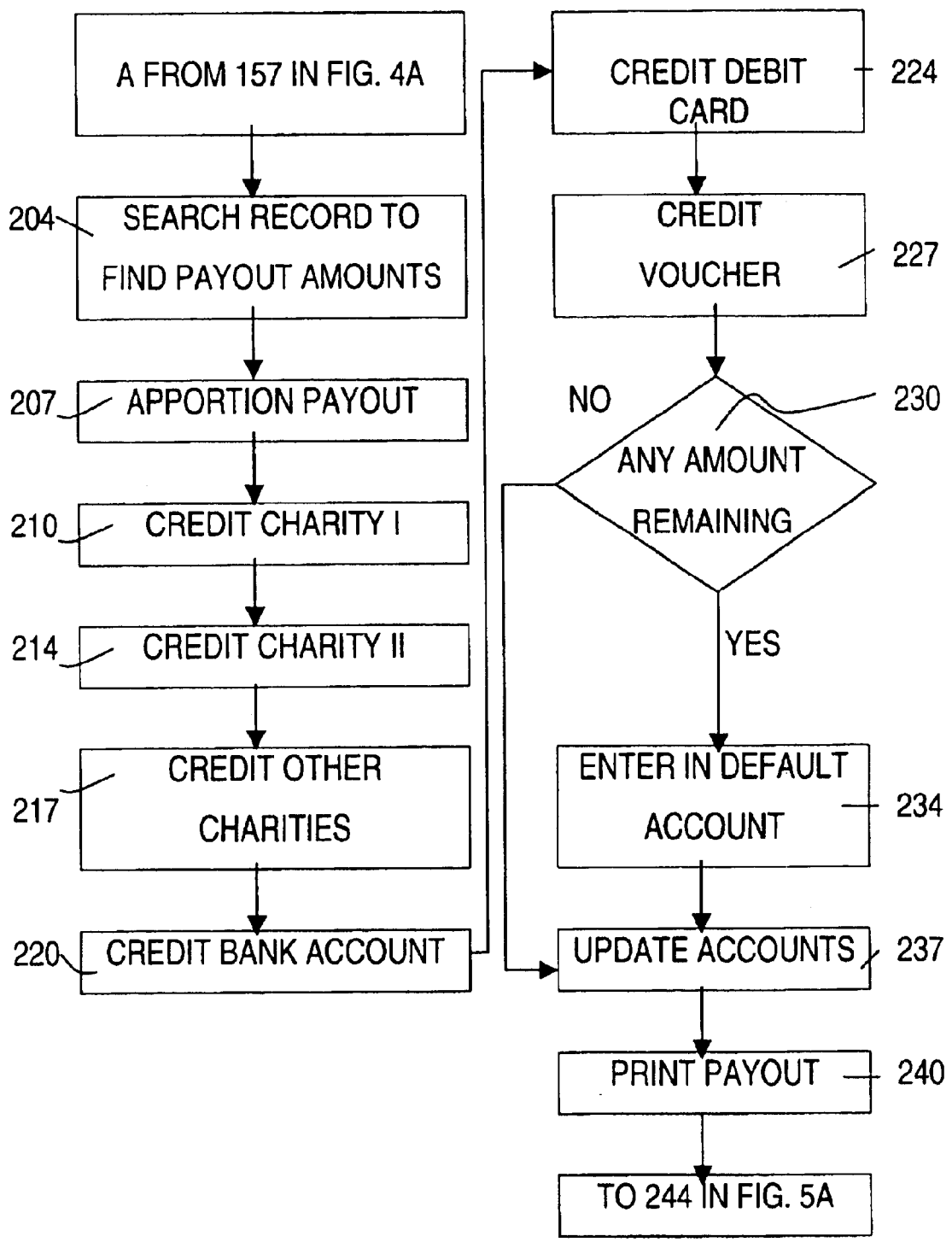

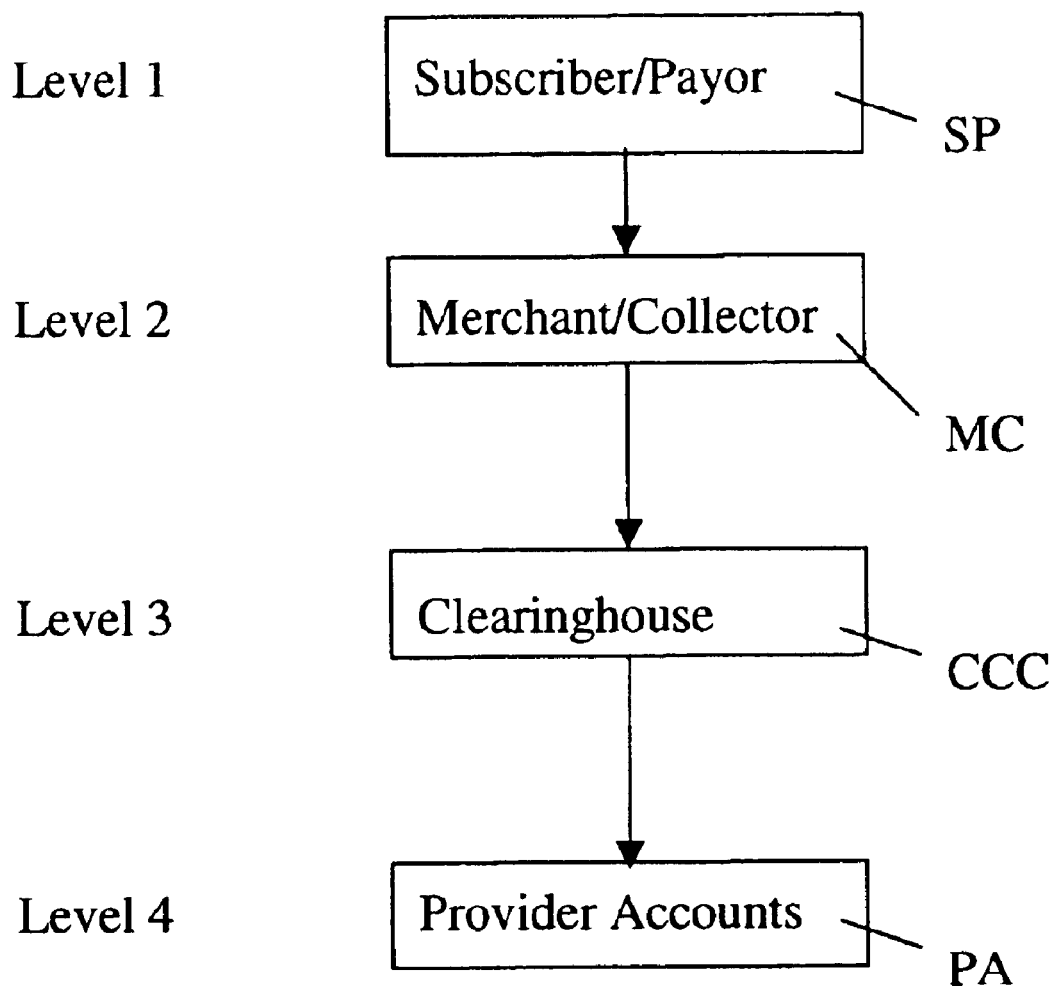

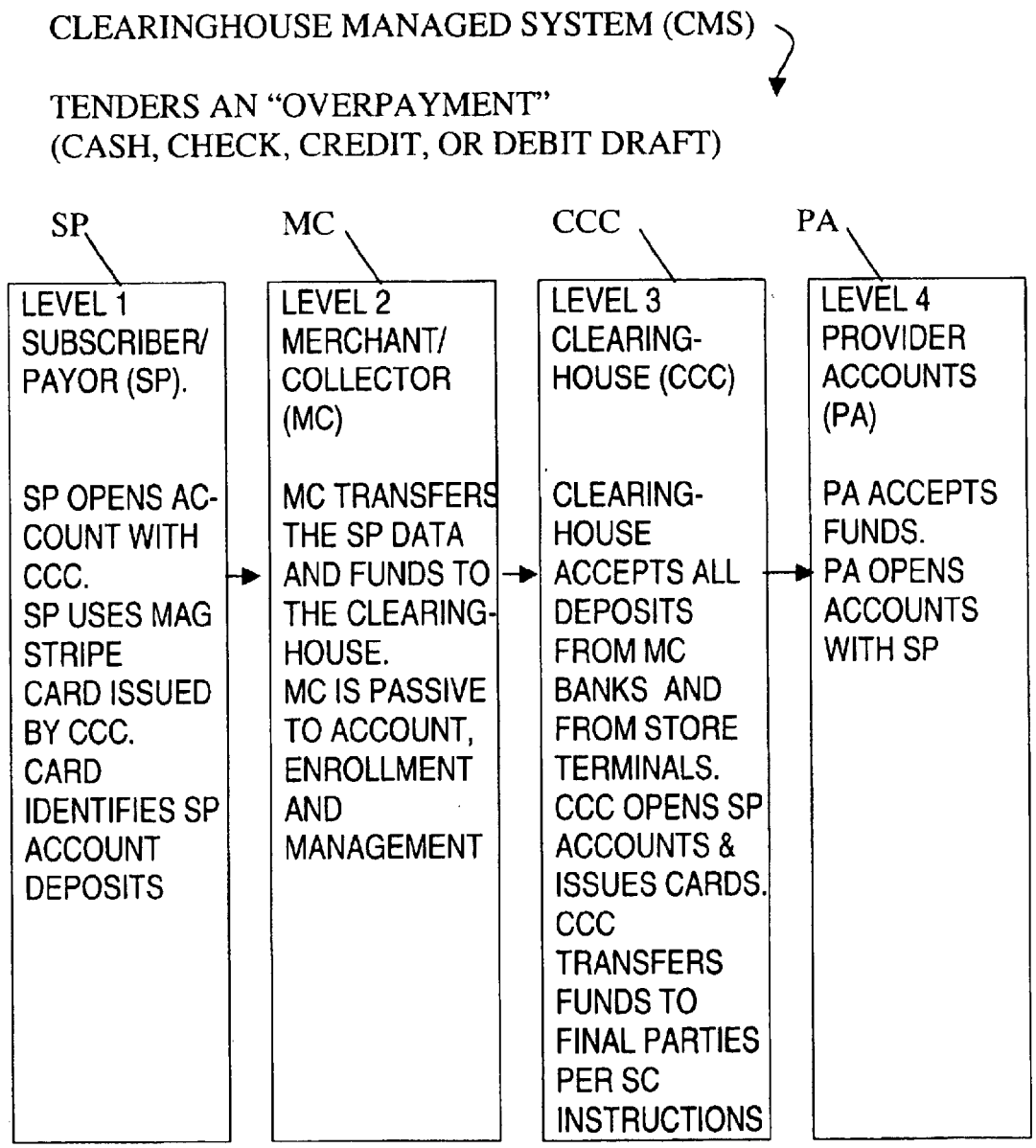
FIG. 8.1 B

FIG. 8.1C
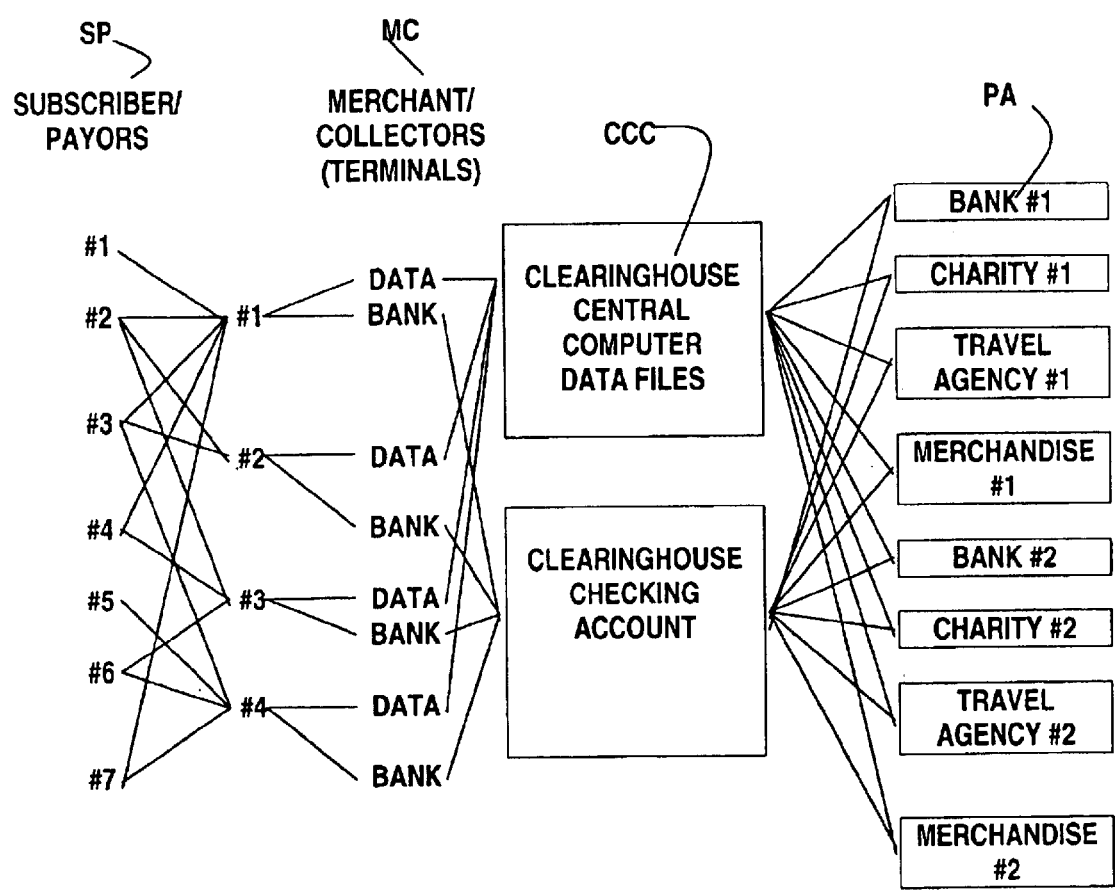

FIG. 8.1D
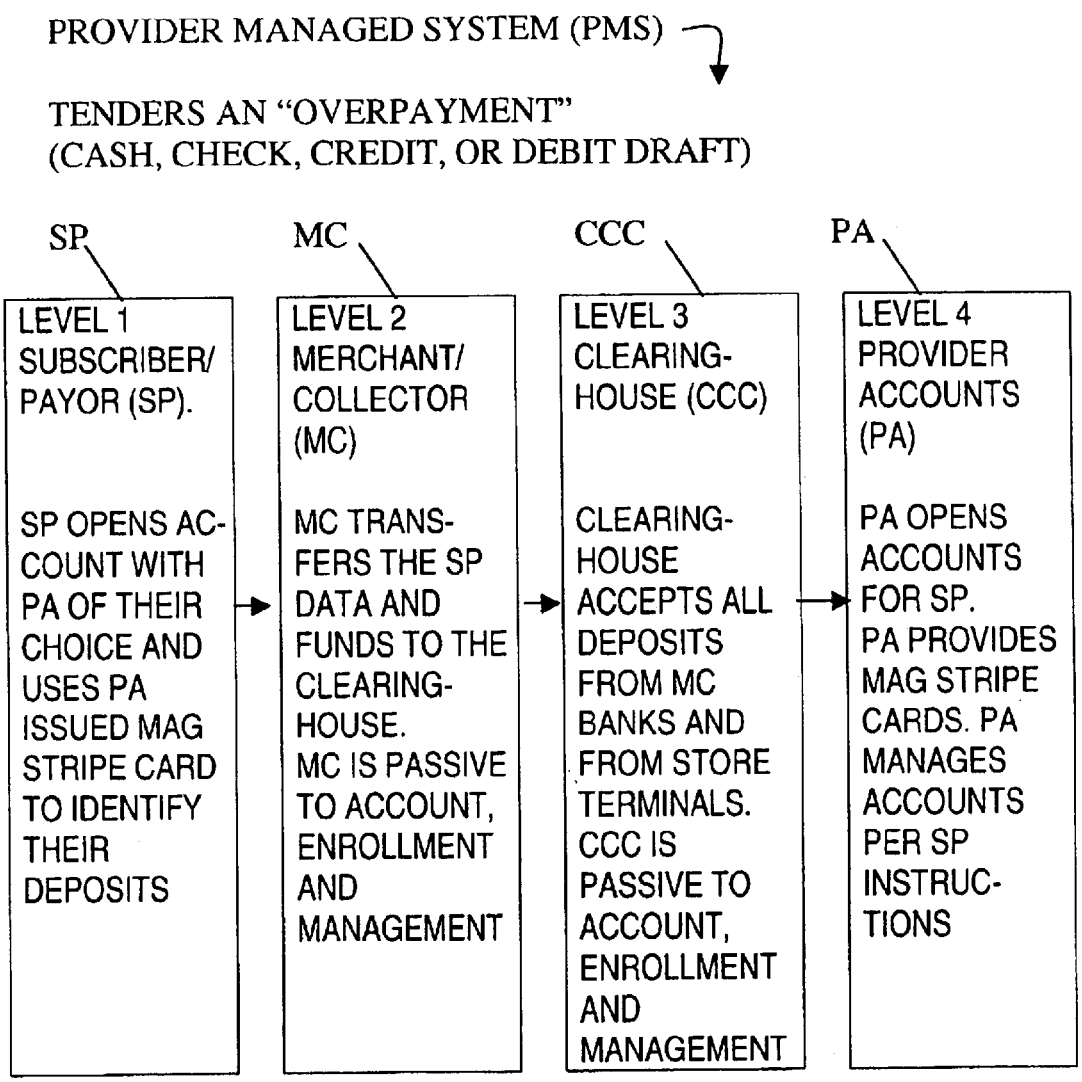

FIG. 8.1E
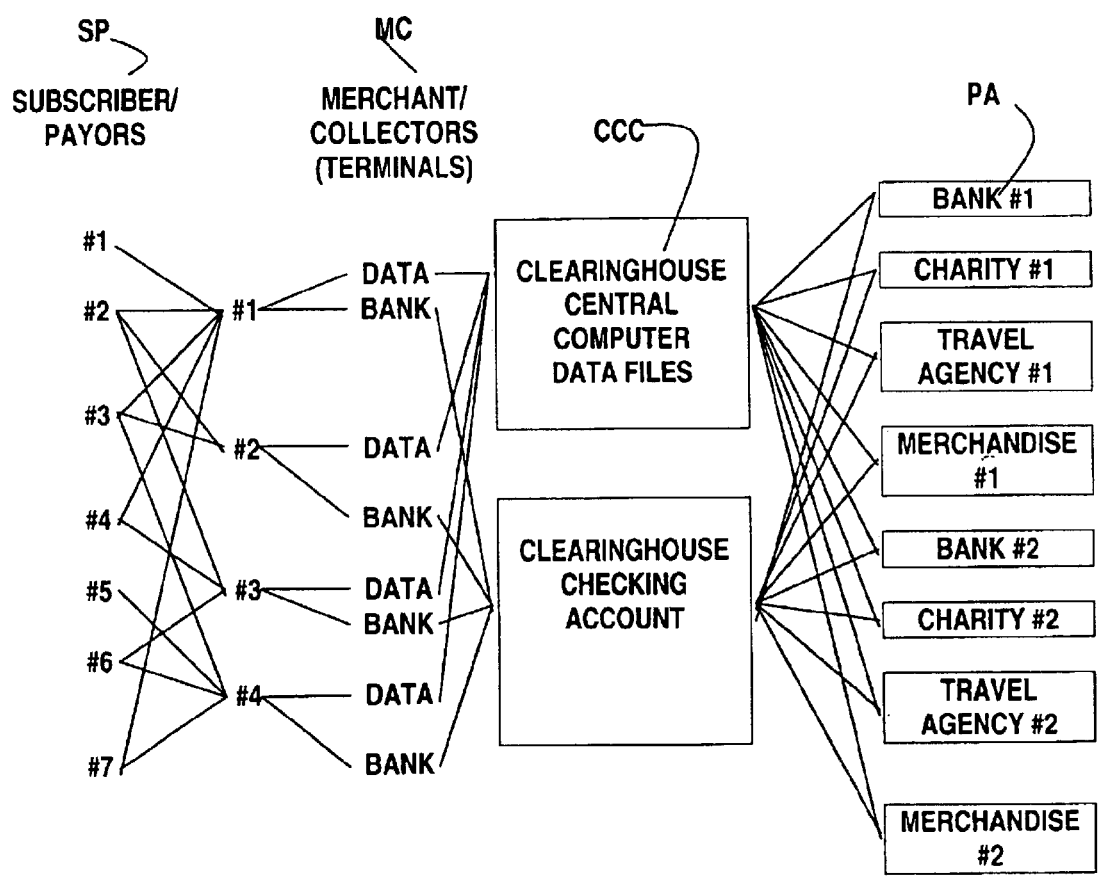

FIG. 8.1 F
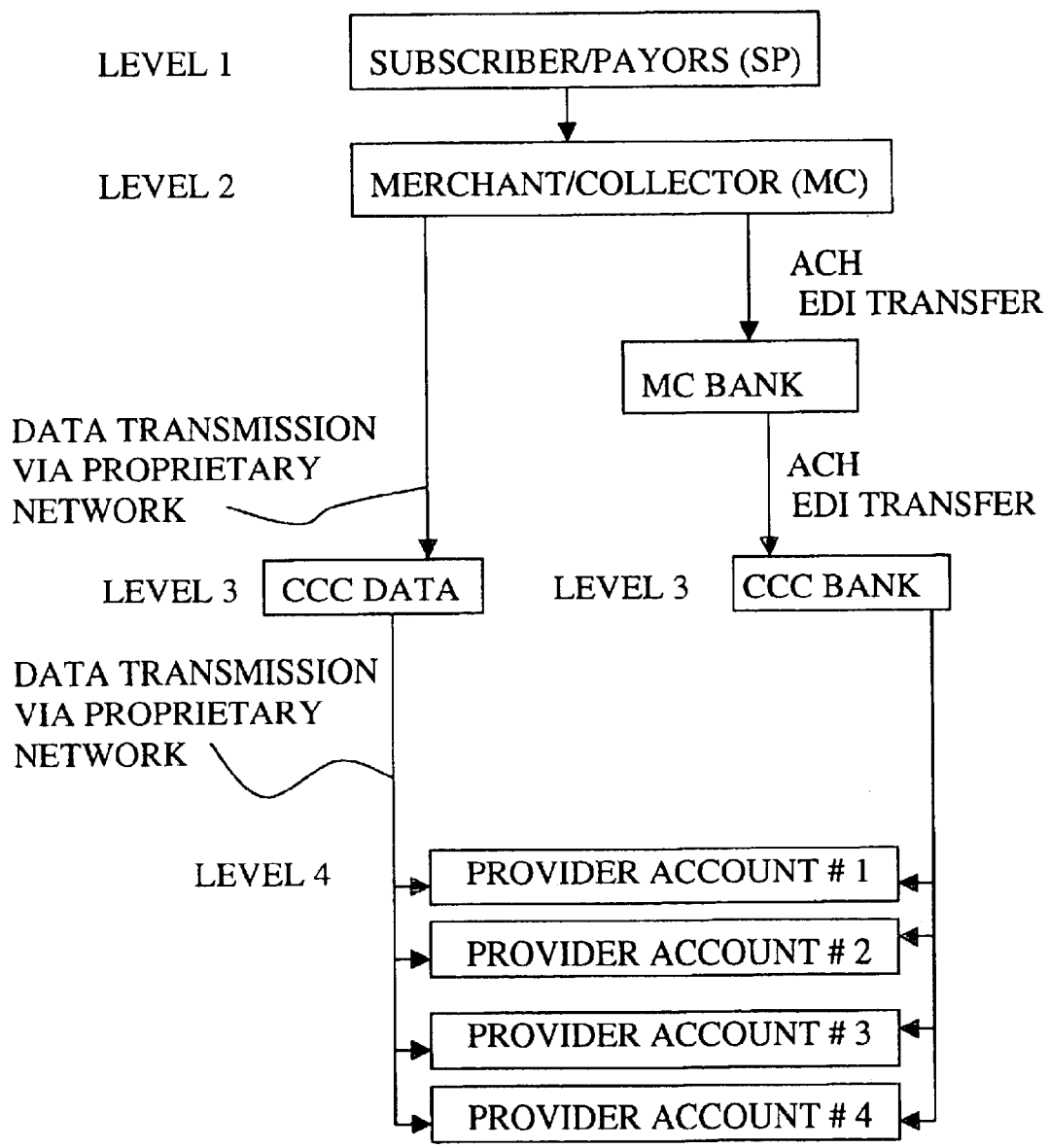

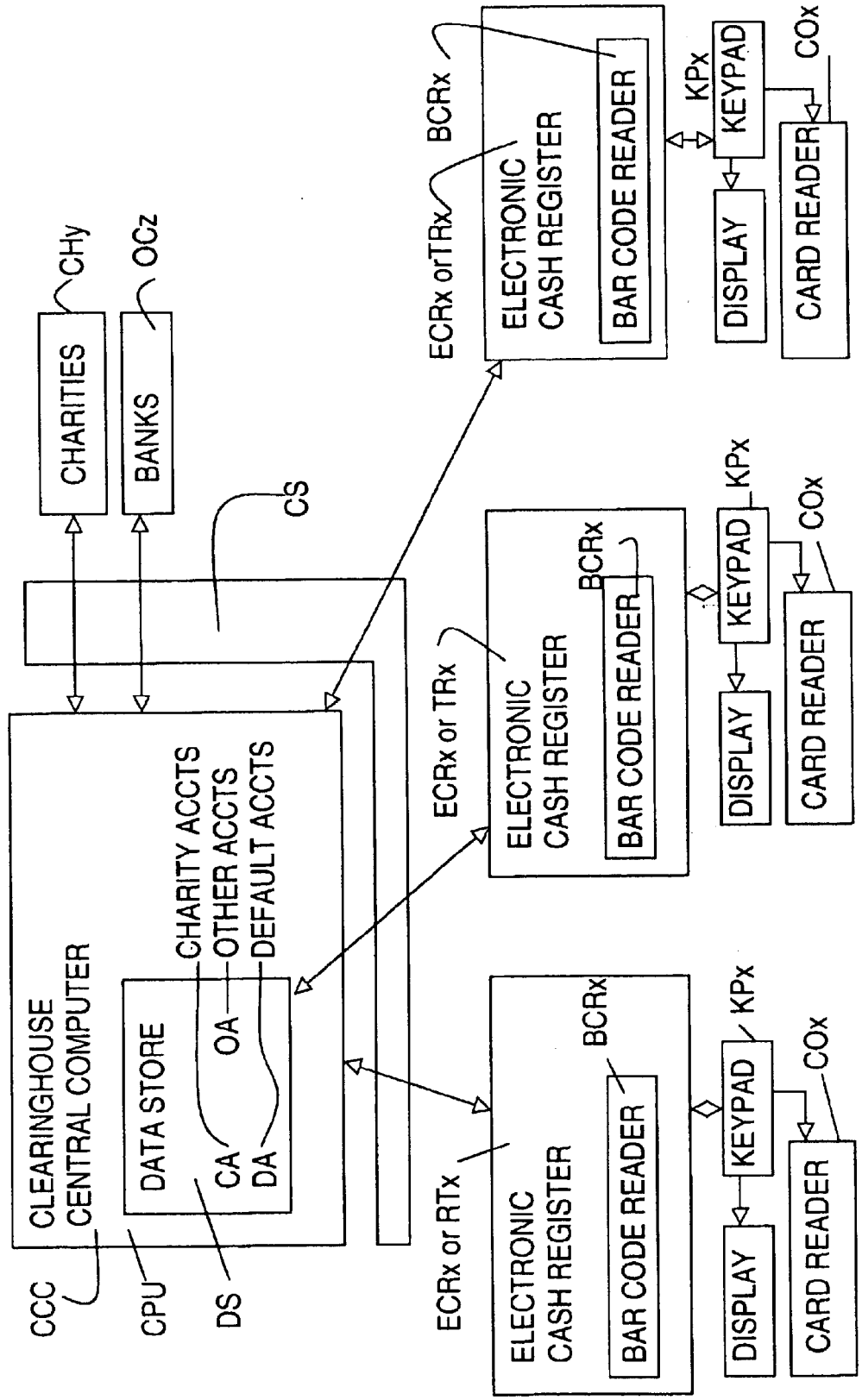
FIG. 8.2

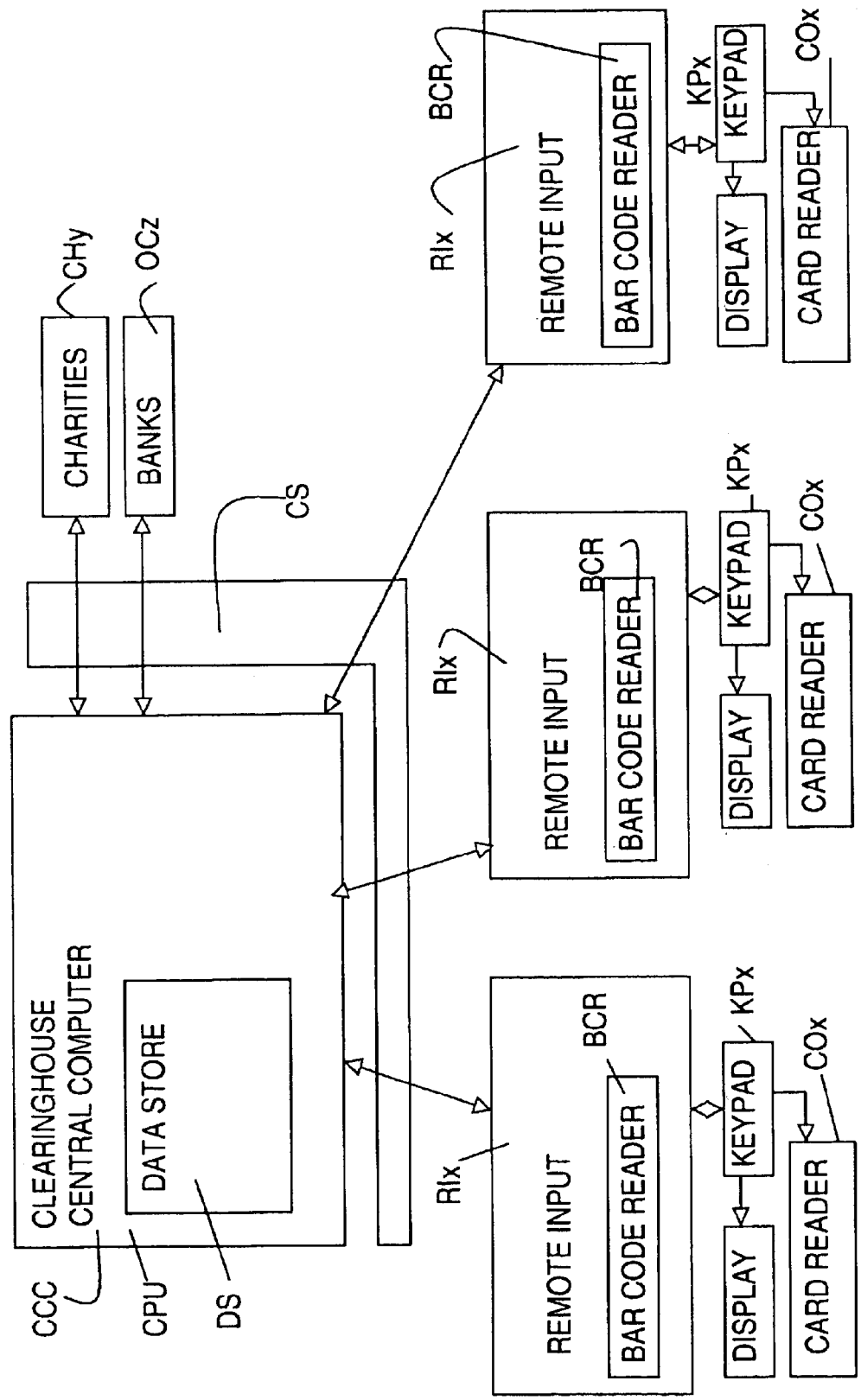
FIG. 8.2A

FIG 8.3
Transaction Card
DC 1
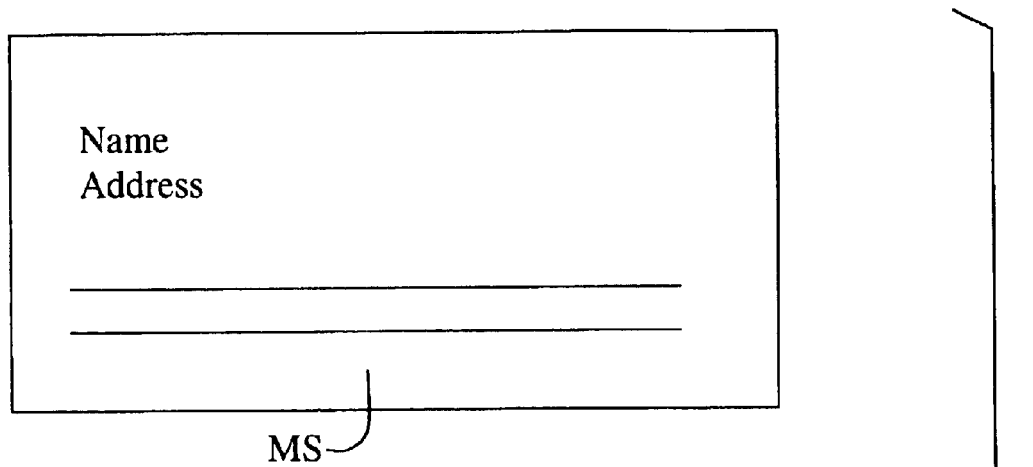
DC 2
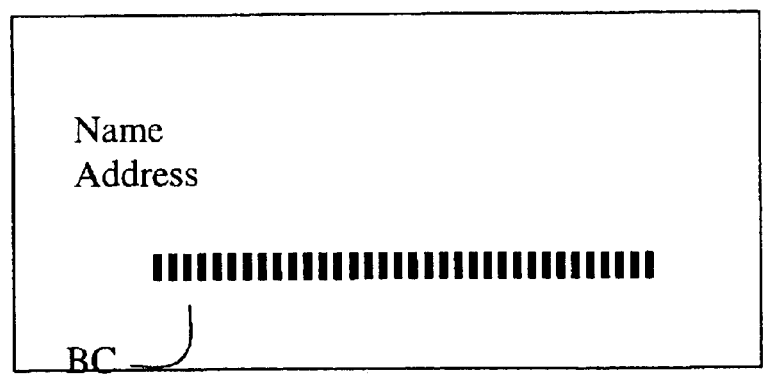

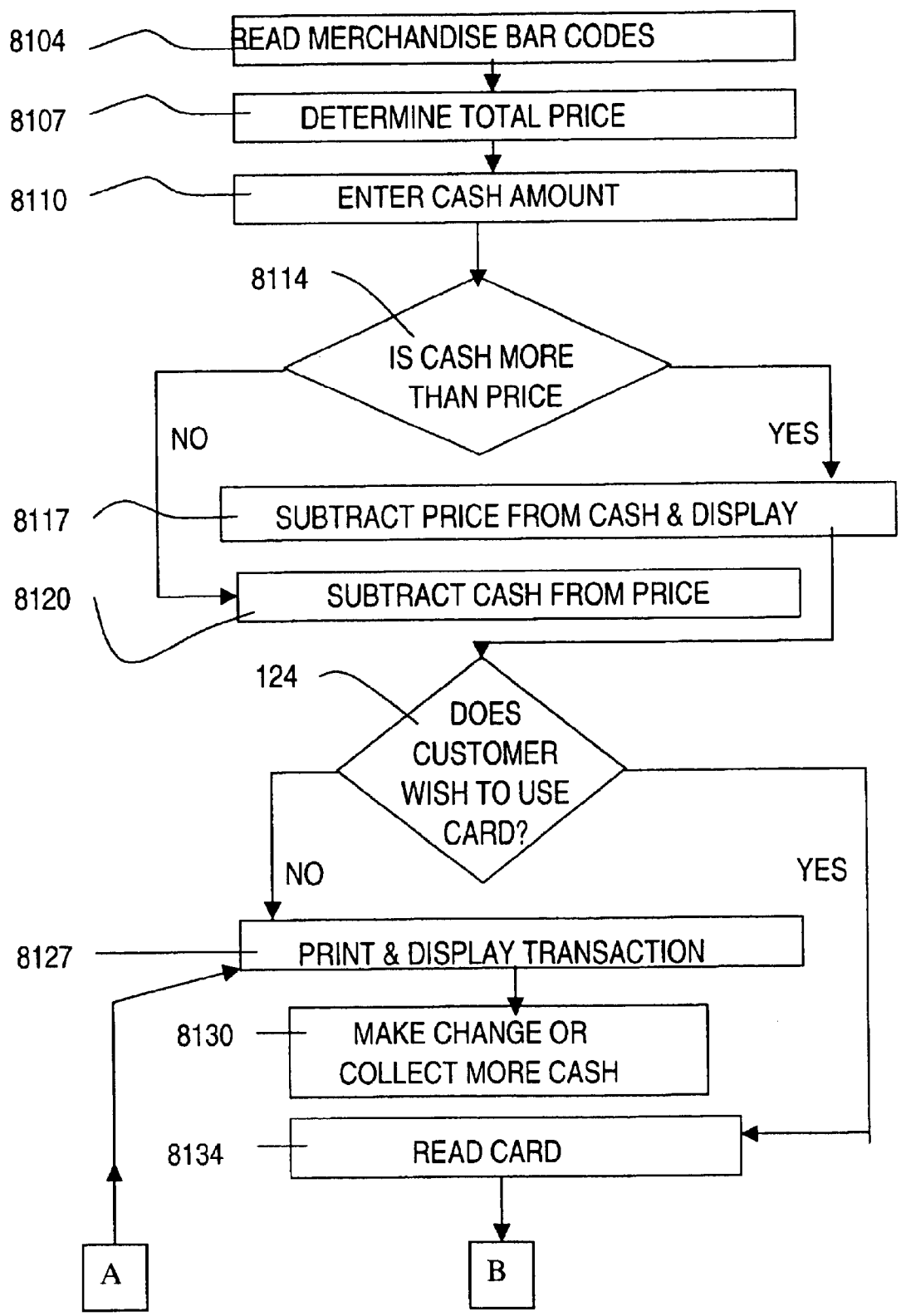
FIG 8.4

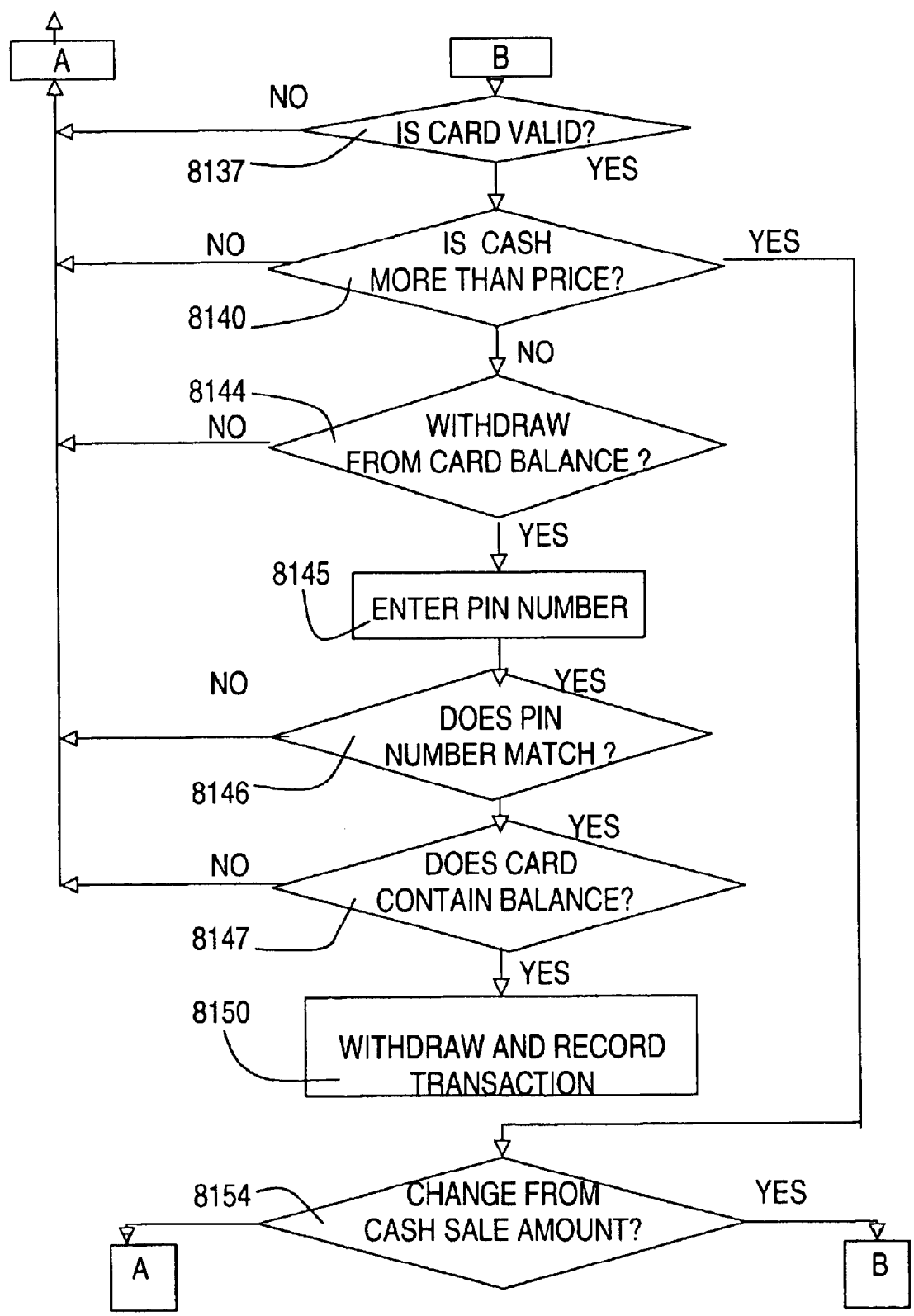
FIG 8.4B

FIG. 8.4C
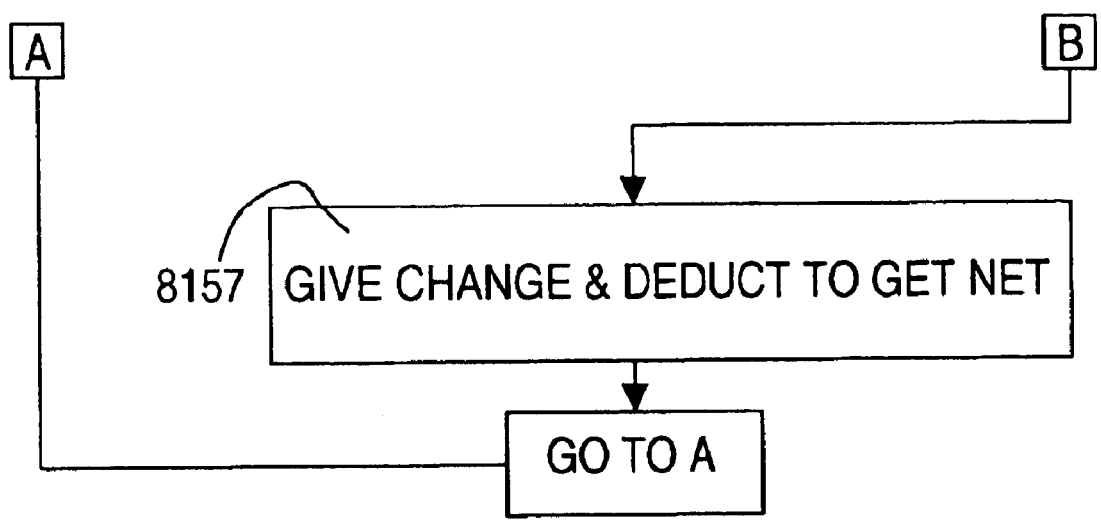

FIG. 8.4D
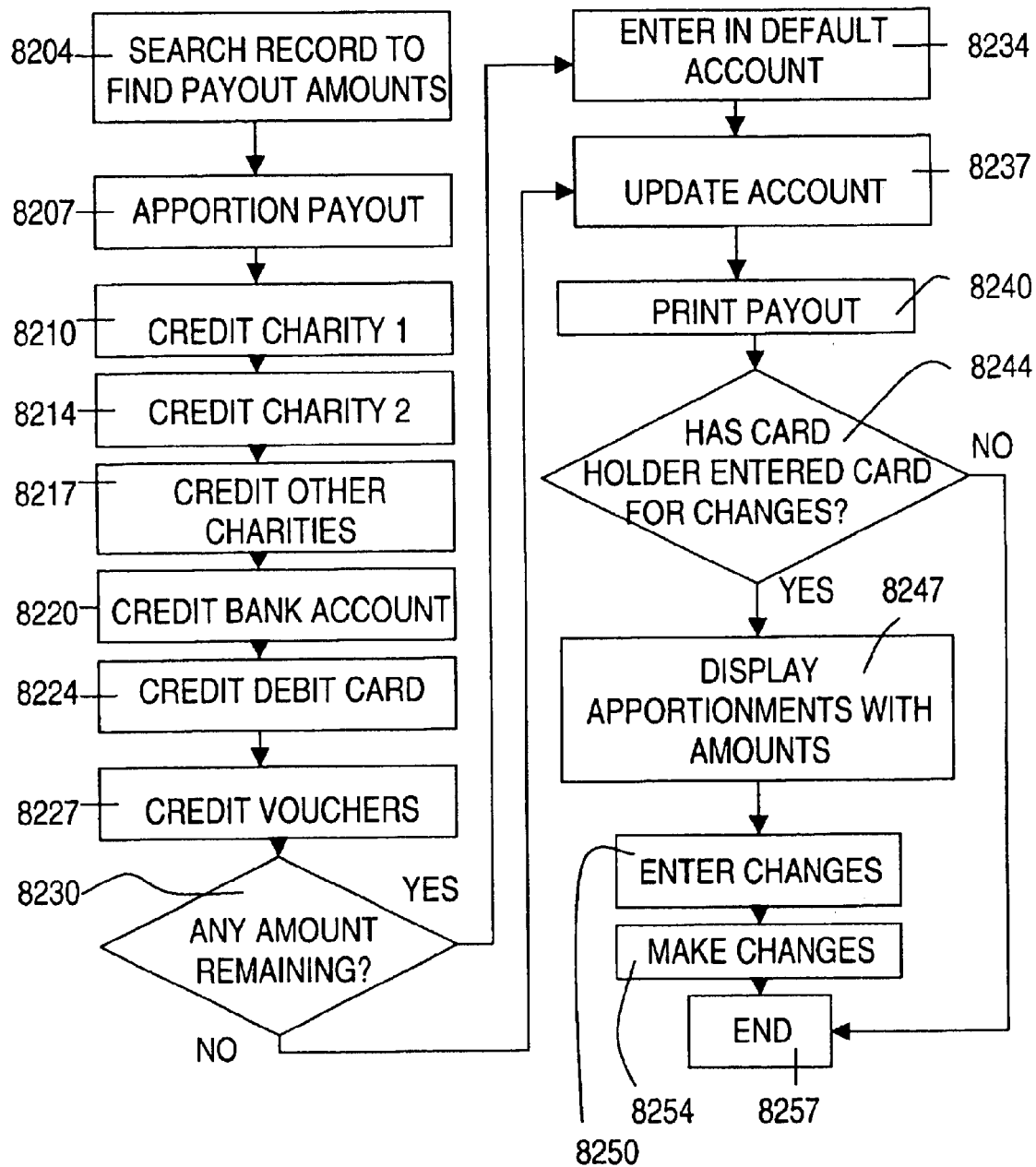

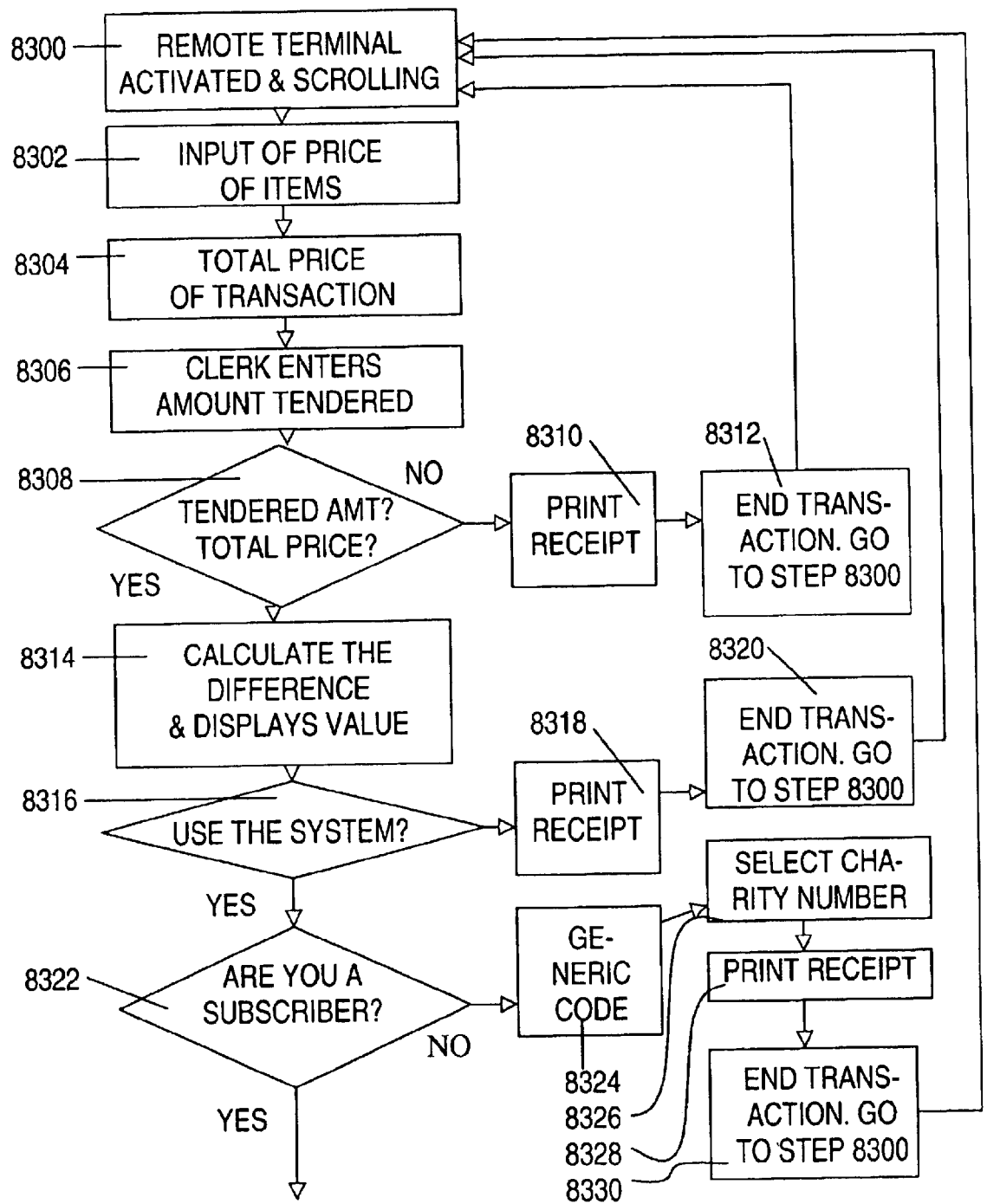
FIG. 8.5A

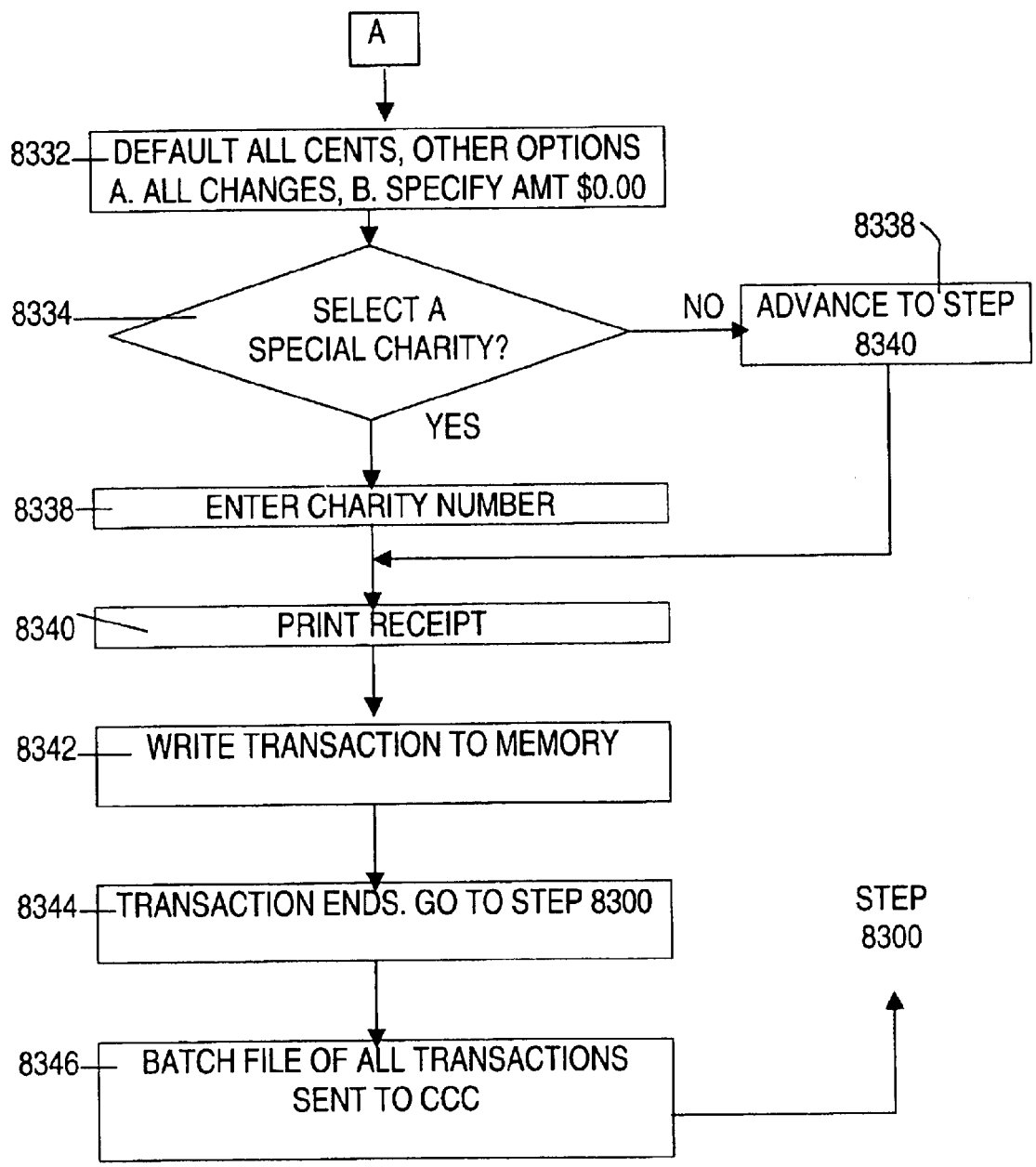
FIG. 8.5B

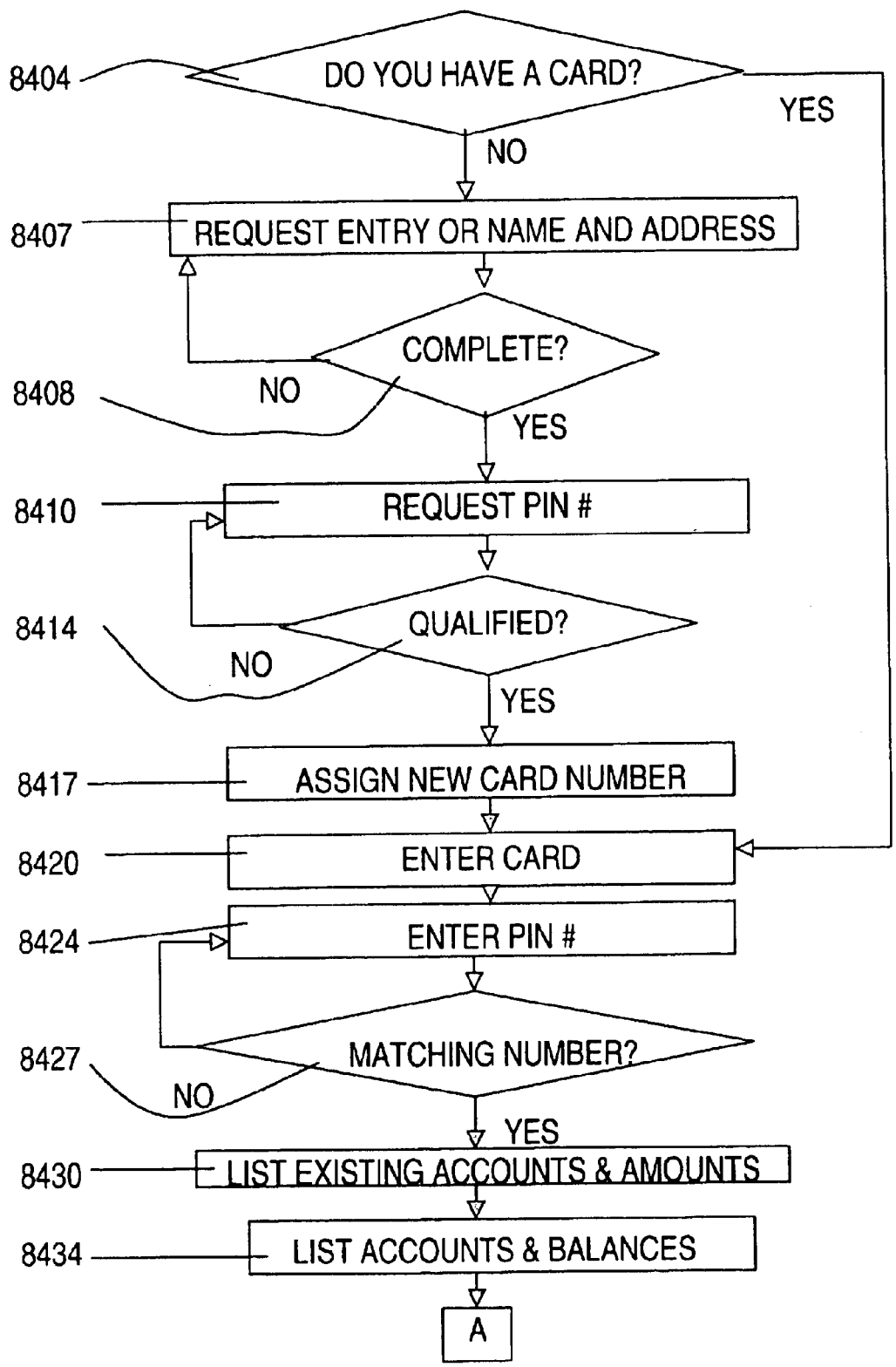
FIG. 8.6A

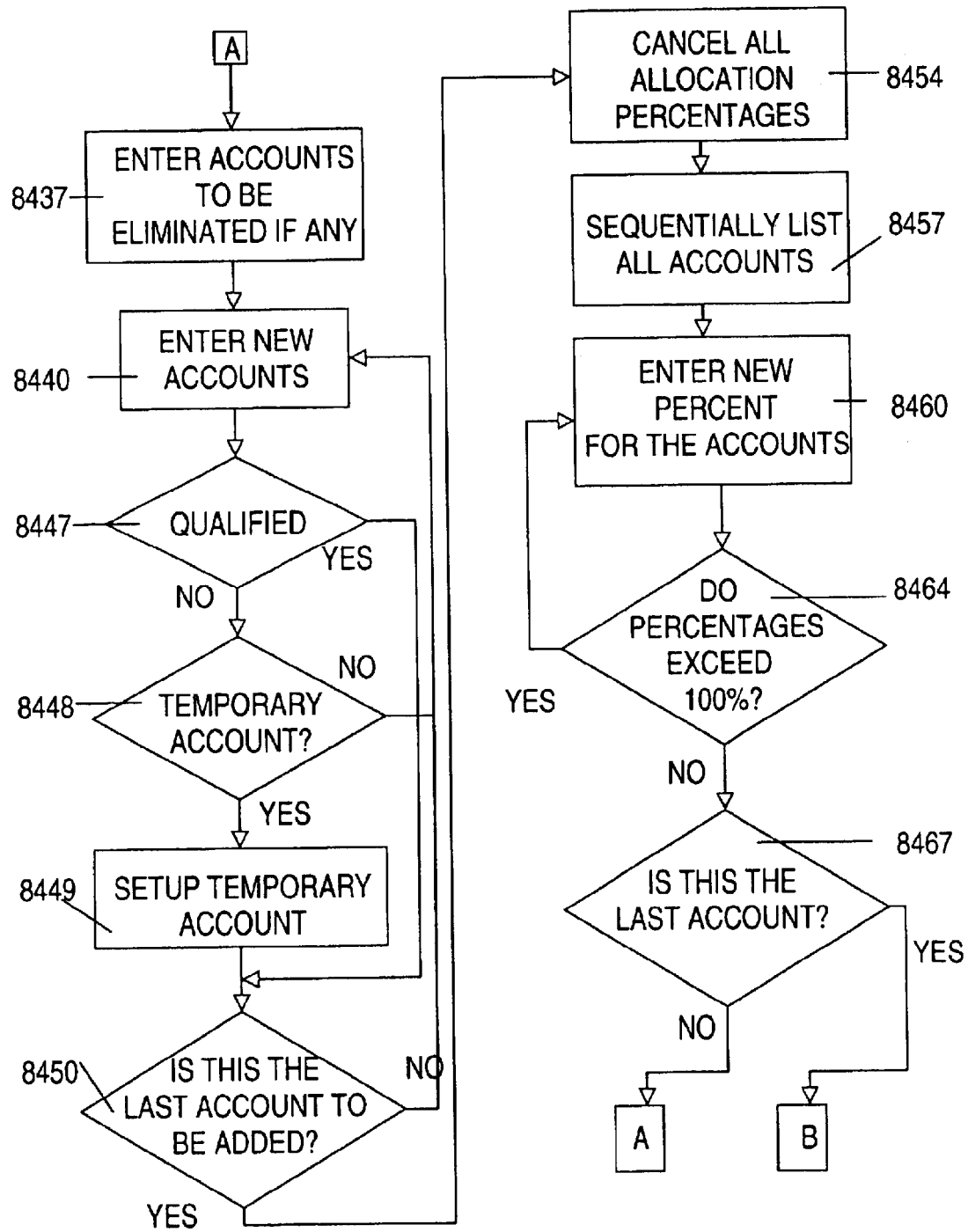
FIG. 8.6B

FIG. 8.6C
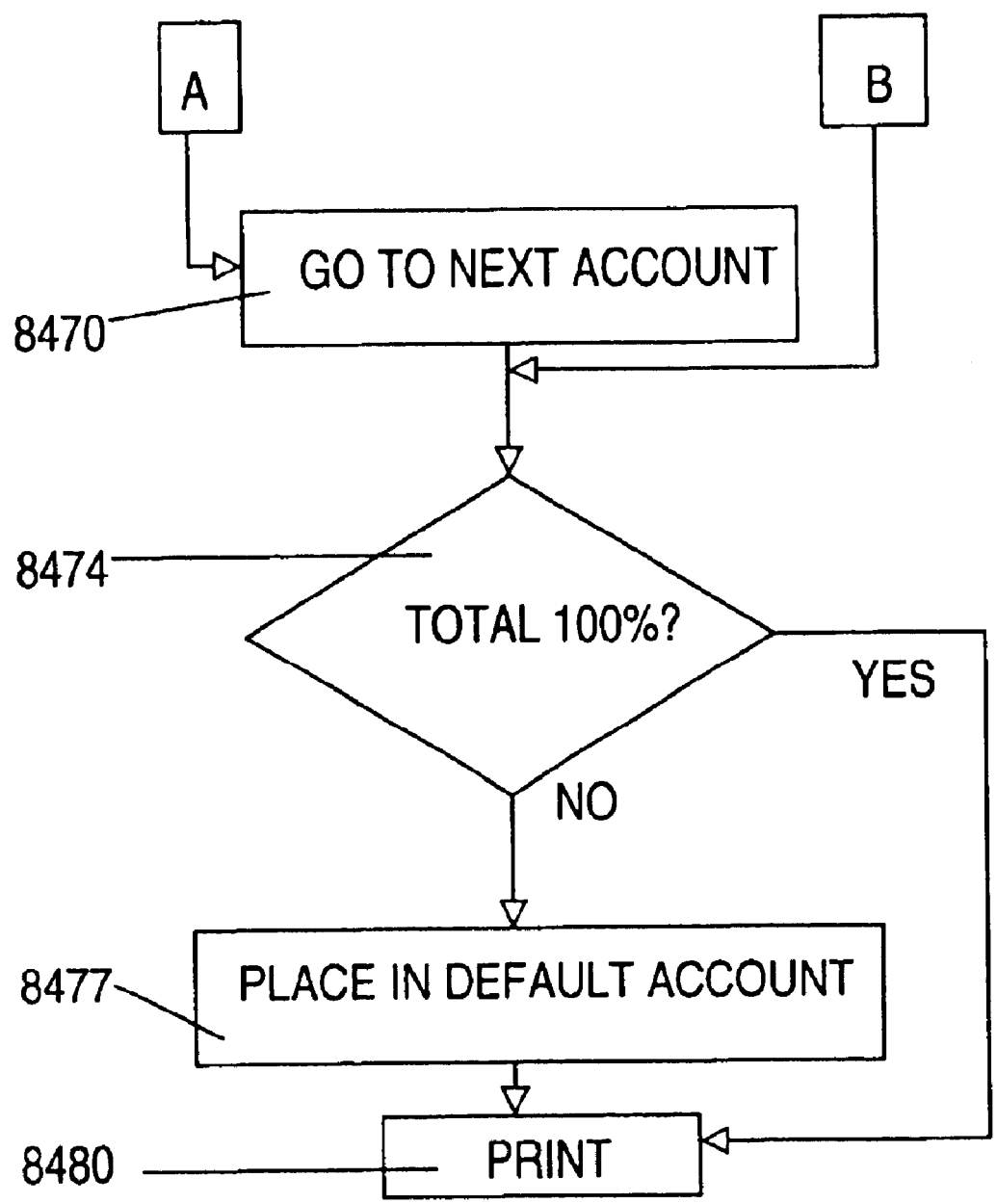

US 6,876,971 B1

FUNDS DISTRIBUTION SYSTEM CONNECTED WITH POINT OF SALE TRANSACTION

RELATED APPLICATIONS

The present application claims the benefit of U.S. application Ser. No. 08/843,424 filed Apr. 15, 1997 now U.S. Pat. No. 6,088,682 issued Jul. 11, 2000, which is a continuation-in-part of U.S. application Ser. No. 08/349,353 filed Dec. 5, 1994, now U.S. Pat. No. 5,621,640 issued Apr. 15, 1997; which is a continuation of U.S. application Ser. No. 08/018,821 filed Feb. 18, 1993, now abandoned; and a continuation of application Ser. No. 08/429,758 filed Apr. 27, 1995, now U.S. Pat. No. 6,112,191 issued Aug. 29, 2000; and a continuation of U.S. application Ser. No. 08/493,396 filed Jun. 22, 1995, now abandoned. The present application also claims the benefit of the aforementioned U.S. application Ser. No. 08/429,758 filed Apr. 27, 1995 now U.S. Pat. No. 6,112,191 issued Aug. 29, 2000; which is a continuation-in-part of U.S. application Ser. No. 08/349,353 filed Dec. 5, 1994, now U.S. Pat. No. 5,621,640 issued Apr. 15, 1997; which is a continuation of the aformentioned Ser. No. 08/018,821 filed Feb. 18, 1993, now abandoned.

REFERENCE TO CO-PENDING APPLICATIONS

This is a Continuation In Part of my application Ser. No. 08/018,821 filed on Feb. 18, 1993, now abandoned, Ser. No. 08/172,221 filed Dec. 23, 1993, now abandoned, Ser. No. 08/429,758 filed Apr. 27, 1995, U.S. Pat. No. 6,112,191, and Ser. No. 08/493,396 filed Jun. 22, 1995, now abandoned.

FIELD OF THE INVENTION

This invention relates generally to improved methods and systems to extend the scope and impact of consumer Point of Sale (POS) transactions.

BACKGROUND OF THE INVENTION

In current shopping situations a consumer makes a cash transaction and all activity ceases. In most occurrences the transaction produces excess change that is often a nuisance to the consumer. The fact that consumers often receive troublesome and often unwanted coins or bills provides a unique opportunity for consumers to save or charitably give at point of sale counters. In addition, at point of sale counters consumers often have funds over and above the amount they will dedicate to their spending transactions. Providing consumers with a way to set aside such discretionary funds would also provide consumers with a painless and convenient way to save or give.

SUMMARY OF THE INVENTION

An embodiment of the invention involves opening, maintaining, and accumulating credits in a payor's account that results from instructing merchants to forward data and funds to a clearinghouse for apportionment and distribution for services or goods.

BRIEF DESCRIPTION OF THE DRAWINGS

FIGS. 4, 4A, 5, and 5A are flow diagrams of the steps that take place in FIGS. 1 and 1A.

FIG. 8.1A is a block diagram of the POS system and features of the embodiments.

FIGS. 8.1B & 8.1C are block diagrams of the Clearinghouse Managed System and features of the embodiments.

FIGS. 8.1D & 8.1E are block diagrams of the Provider Managed System and features of the embodiments.

FIG. 8.1F is a block diagram of the Data and Funds Transfer used in both POS systems and features of the embodiments.

FIG. 8.2 is a block diagram of POS system hardware involving FIGS. 8.1A to 8.1F.

FIG. 8.2A is a block diagram of POS system hardware involving FIGS. 8.1A to 8.1F.

FIG. 8.3 is a view of transaction cards forming part of the embodiment in FIGS. 8.2 & 8.2A.

FIGS. 8.4A to 8.4D are flow diagrams of the steps that take place in FIGS. 8.2 & 8.2A.

FIGS. 8.5A & 8.5B are flow diagrams of steps that take place in a computer in FIGS. 8.1B, 8.1C, 8.2, & 8.2A.

FIGS. 8.6A to 8.6C are flow diagrams of enrollment steps that take place in a computer in FIGS. 8.1B, 8.1C, 8.2, & 8.2A.

DETAILED DESCRIPTION OF PREFERRED EMBODIMENTS

Figure 1:
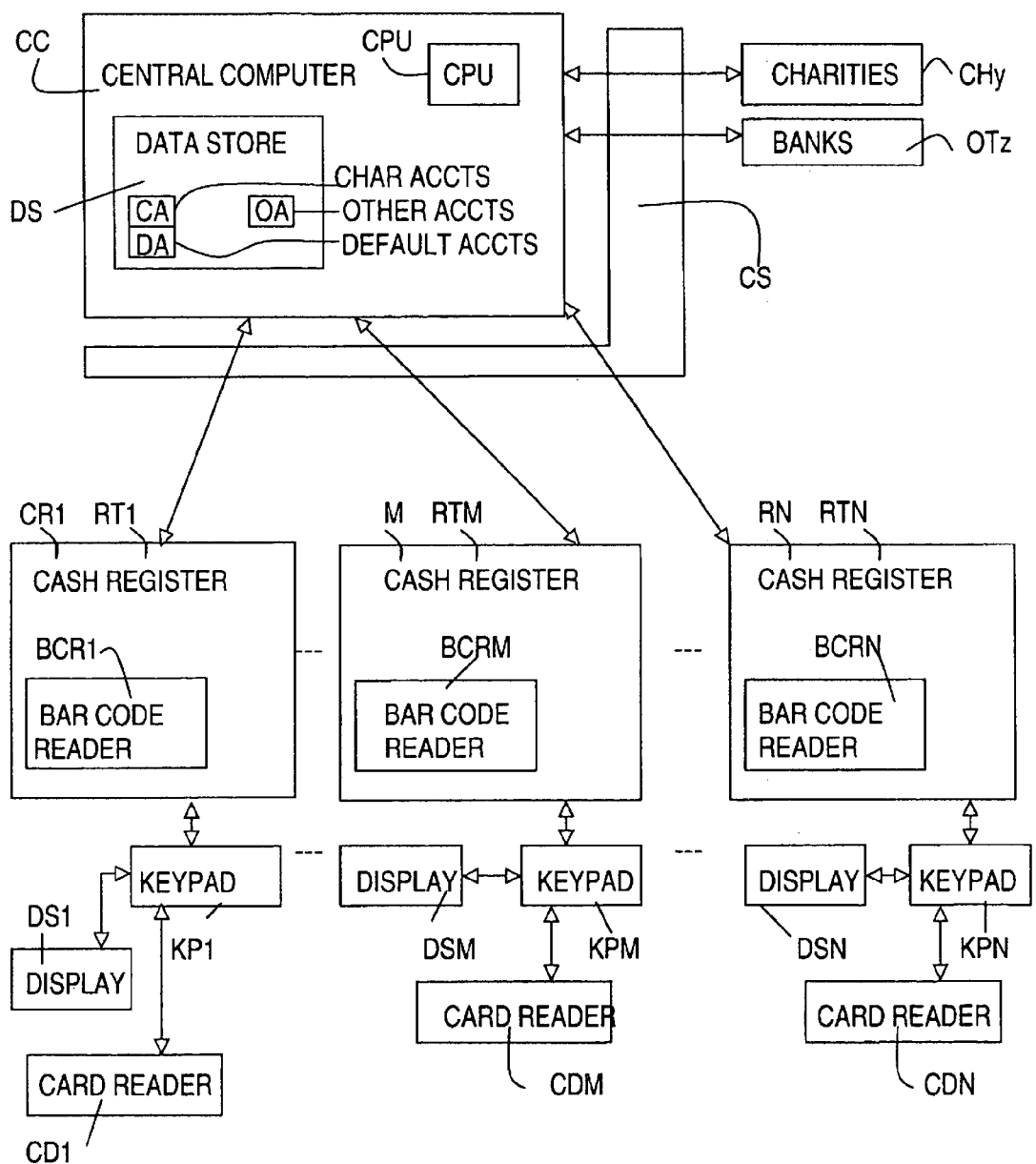
FIG. 1 is a block diagram of the POS system embodiments.

In FIG. 1, an embodiment of the system includes a central computer CC containing a central processor CPU and a large data storage DS. A communications system CS that may include telephone lines, satellites, or cables connects the central computer CC to a number of cash registers CRx (where x=1, ... M, ... N) in retail outlets, such as shops, supermarkets, gasoline stations, department stores, etc. at locations remote from the central computer. Throughout this specification, the term x, when appended to the end of a reference character, is equal to 1, ... M, ... N.

The cash registers CRx connect to respective keypads KPx and card readers CDx. Each cash register CRx, keypad KPx, and card reader CDx connected to each other represents a remote terminal RTx. Each cash register CRx is connected to the central computer CC. Money is collected at the cash registers CRx for crediting to the consumers' ledgers in the accounts of various charities and other institutions such as banks, debit card issuers, credit card issuers, etc. The data storage DS contains individual storages for charity accounts CA and other accounts OA, such as for banks etc., all with ledgers for individual consumers.

The communications system CS also connects the central computer CC to charity computers CHy and other computer OCz, where y=1 ... k, and z=1 ... j such as bank computers BKx and various charities such as debit account holders, credit card issuers, etc. These charities and other institutions are the ultimate receivers of the donations and the money transfers collected at the cash registers CRx. The computer CC also includes a default account DA with consumer ledgers to hold moneys not otherwise allocated.

The cash register CRx includes a chance display for exhibiting cash transactions, credit cards, or check purchases. The display automatically operates to show numbers in question. A card reader CDx with a keypad KPx allows the donor or clerk to enter the donation directly. The keypad KPx permits the donor to change the allocation for this transaction alone or permanently. The keypad KPx also allows the donor to reduce the amount donated so that he can receive cash change. The terminal RTx reports the donation directly to the central computer CC via the communication system CS. The central computer CC prints out periodic reports for interested parties on a need-to-know basis.

Figure 1A:
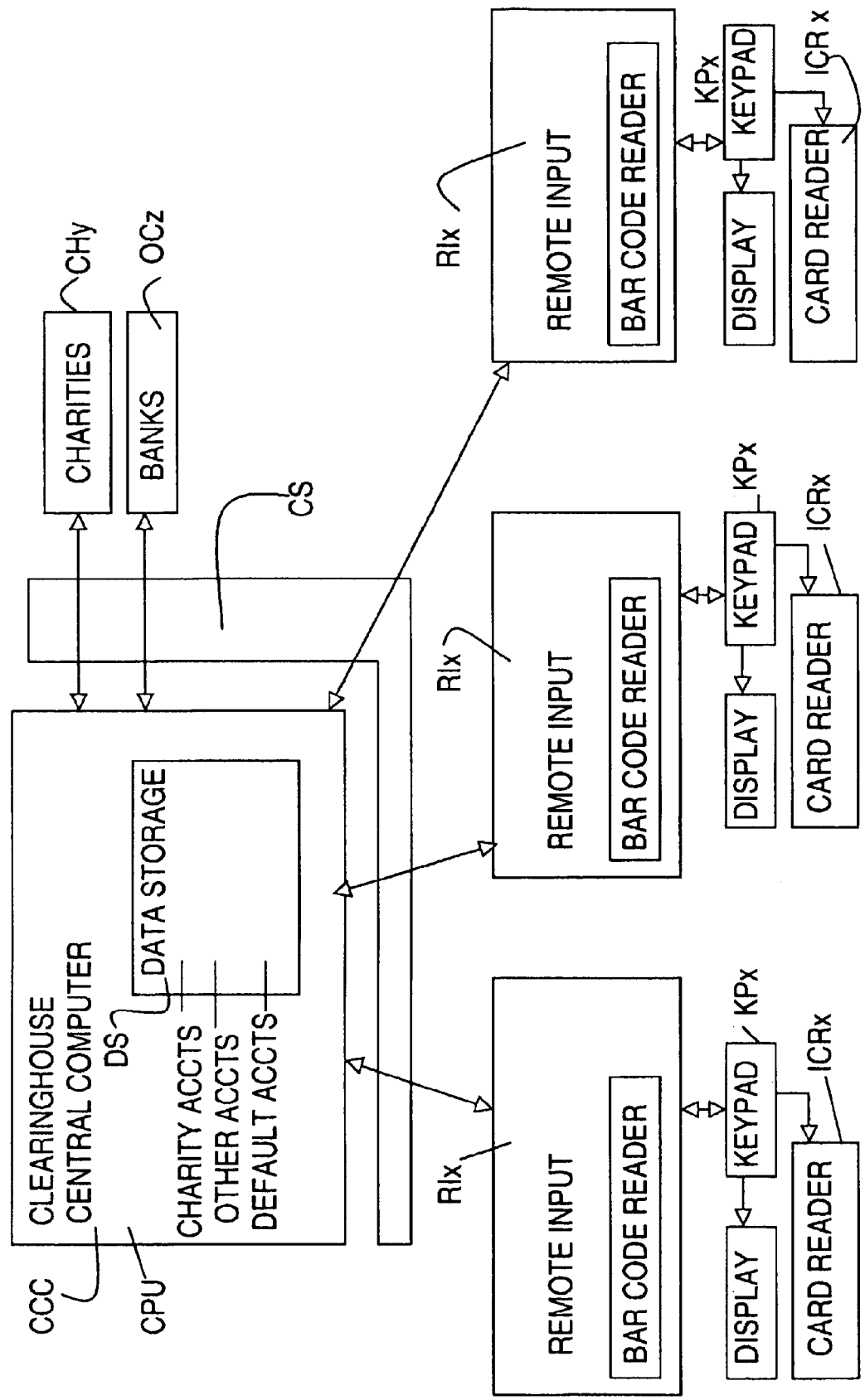
FIG. 1A is a block diagram of the POS system embodiments.

FIG. 1A is identical to FIG. 1 except that the cash registers CRx are replaced generally by remote inputs RI1 . . . RIM . . . RIN (RIx collectively). Examples of such inputs include cash registers, point of sale terminals, and draft capture machines. In the description below, reference to cash registers CRx also generally includes the remote inputs RIx.

According to an embodiment, a consumer in a shop, supermarket, gasoline station, department store, etc. selects the desired merchandise and bring them to a clerk. The clerk inputs the price of all items in a cash register CRx by way of a register keyboard or a bar code reader and the register totals the price. The consumer then offers the clerk either the exact amount of cash or a sum exceeding the price, and the clerk enters that cash and the amount into the cash register. The cash register CRx then subtracts the price from the cash.

If the consumer gives the clerk the exact price nothing more need happen. However, if the money offered the clerk exceeds the price, the consumer may, if he or she wishes, choose to receive the change or to donate or save all or a portion of the change. To do the latter, he or she enters a donor card number into the keypad KPx or enters the donor card itself into the card reader CDx. The latter reads the number from a bar code or magnetic stripe on the card. The consumer can also enter into the keypad how much of the total change he or she is to receive should be credited to various predetermined accounts in the central computer CC. The register CRx reads the numbers entered into the keyboard or the number entered by way of the card reader CDx.

Figure 2:
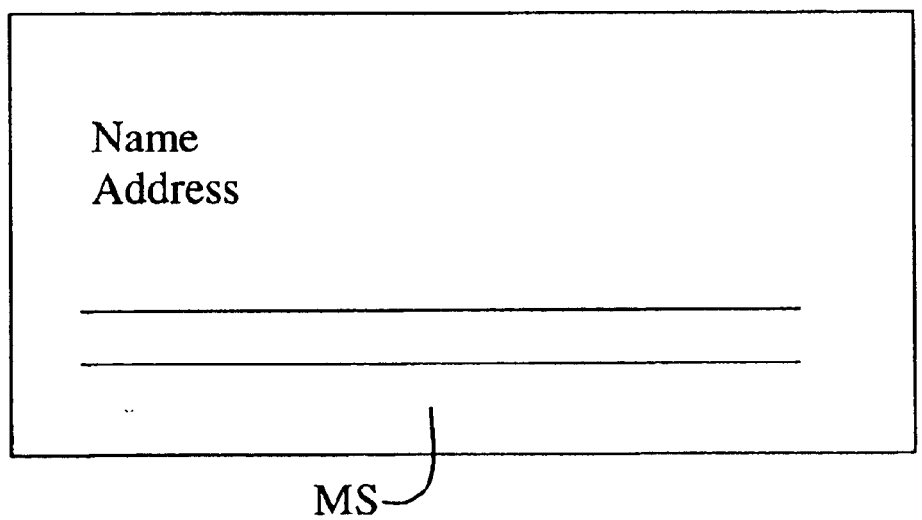
FIGS. 2 and 3 are views of identifier cards forming part of the embodiment in FIGS. 1 and 1A.
Figure 3:
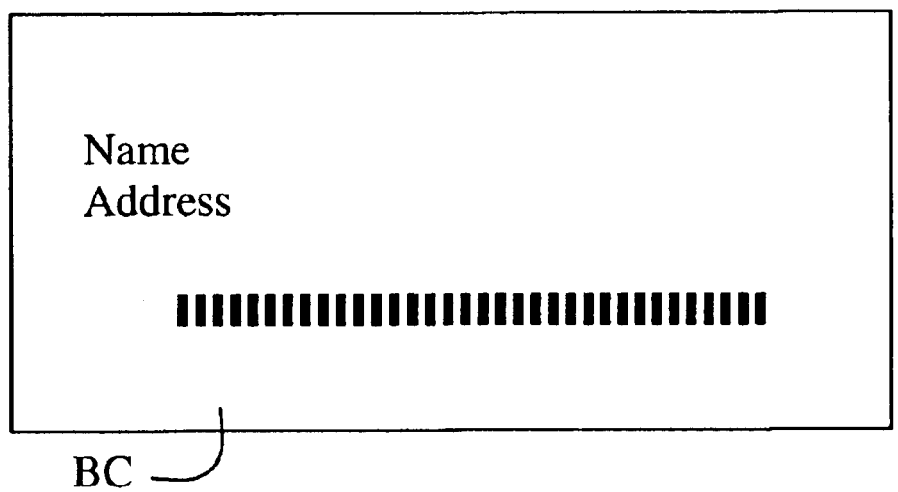

A donor card DC1 according to an embodiment appears in FIG. 2 with a magnetic stripe MS carrying the donor's number. A card DC2 in FIG. 3 includes the number in the form of a bar code BA.

After receiving the data, the register CRx accesses the central computer CC. The latter allocates the change, or portion of the change selected by the consumer, among various charity accounts CA and other accounts OA in the computer CC according to the preprogrammed commands which the consumer has previously entered into the central computer. The consumer receives a printout of all donor transactions as well as the just-completed commercial transaction.

If desired, the consumer can choose to donate only a fraction of the difference between the cash presented and the price. The consumer then enters the amount to be donated and receives the appropriate cash change.

According to another embodiment, with every transaction, the computer CC electronically transfers all amounts allocated to each charity CHy, immediately or as soon as the computer can access the charity computer. In this way the donor is always assured that the contribution takes effect immediately. Transfers in the other accounts OA may be sent immediately or held until a sufficient amount is accumulated to be acceptable by the other institutions.

Figure 4:
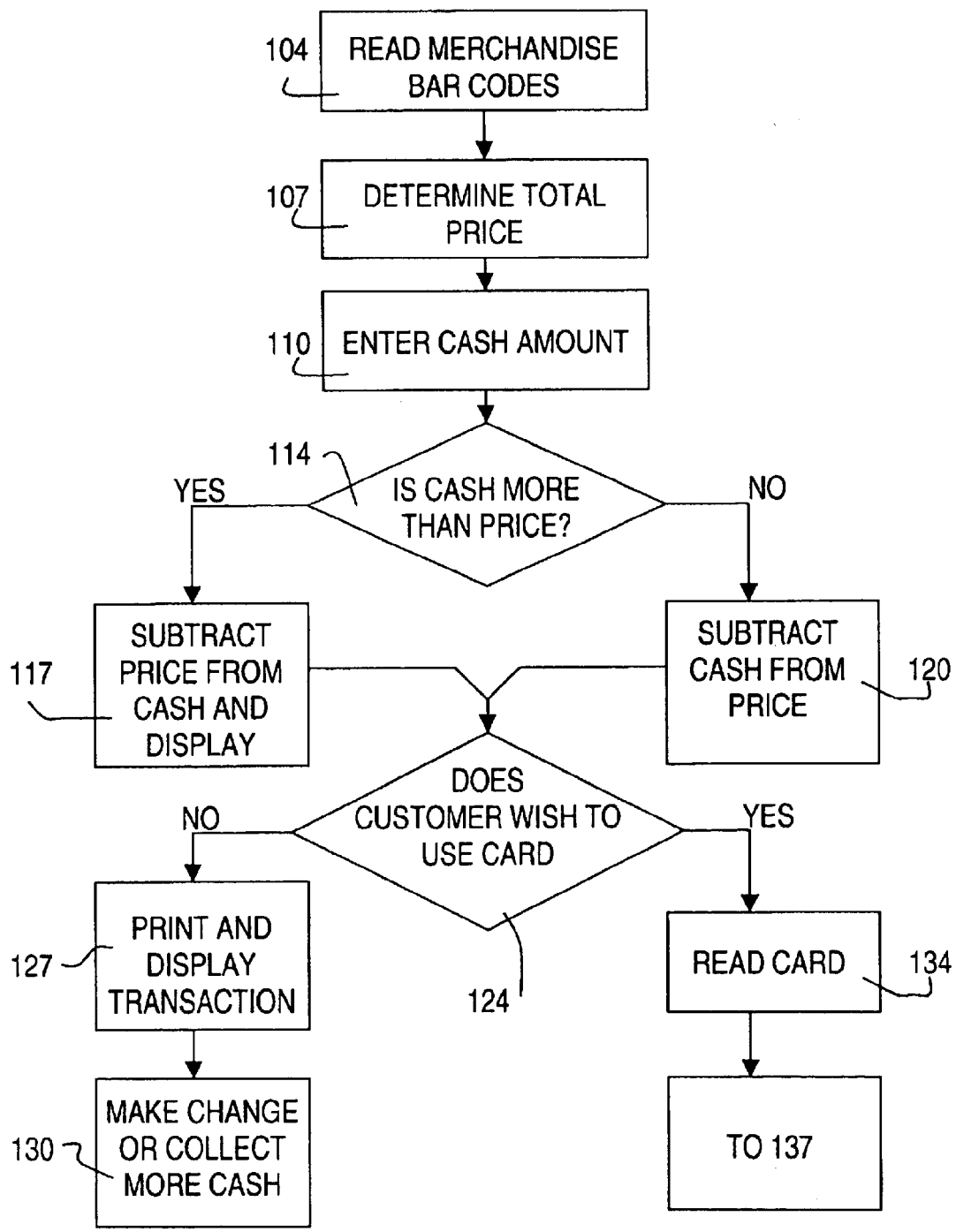
Figure 4A:
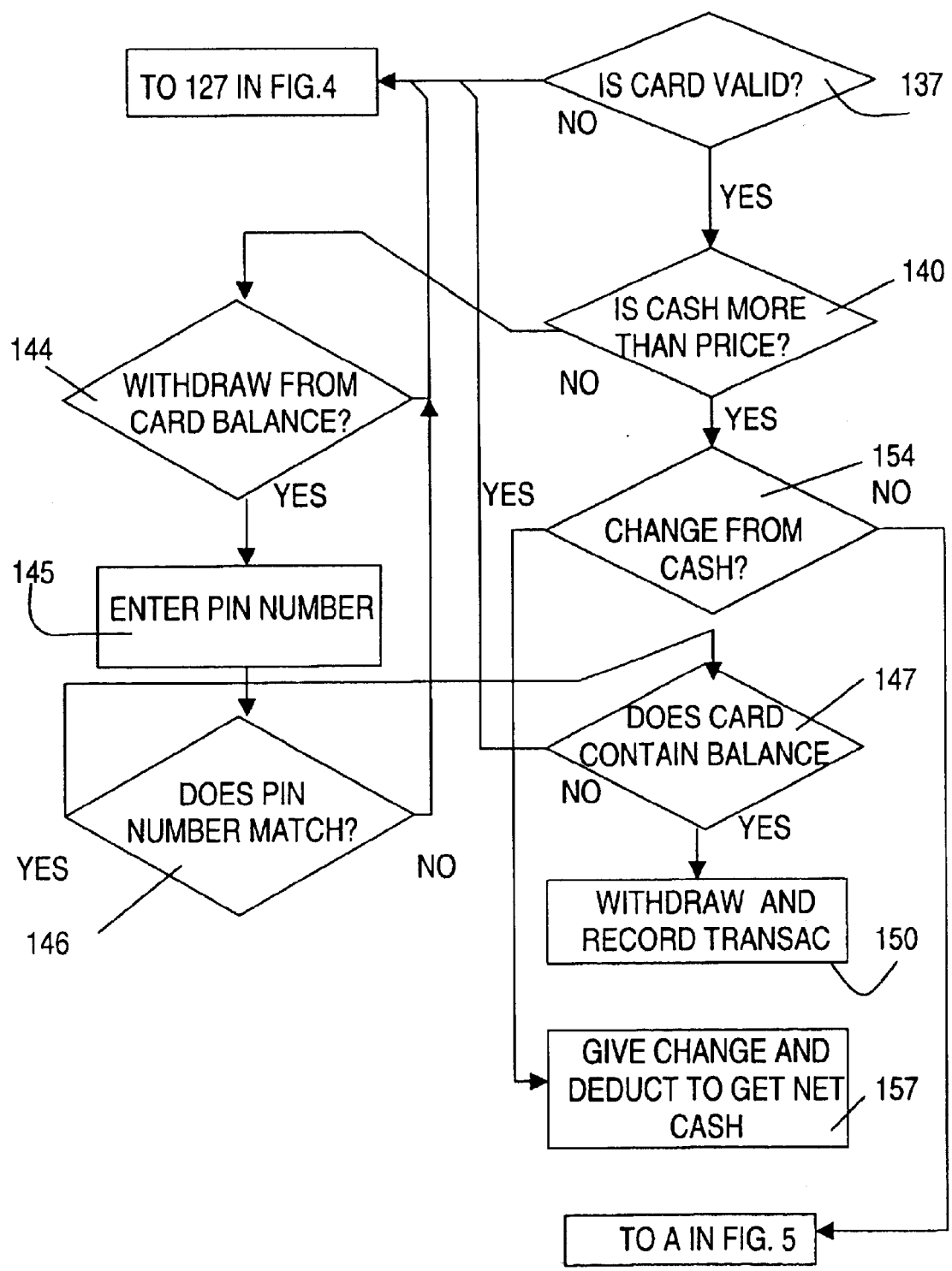
Figure 5A:
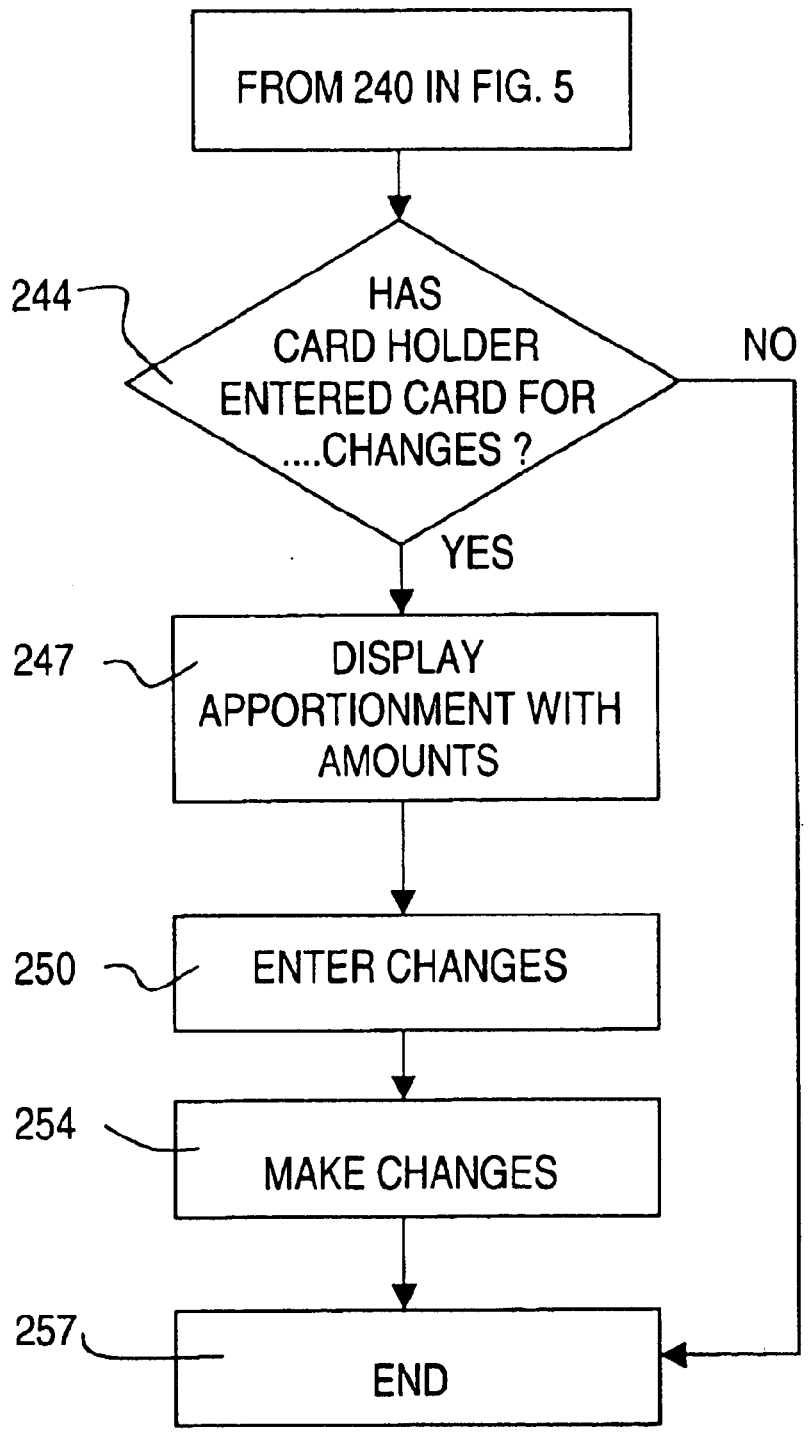

An example of the operation of a cash register CRx, keypad KPx, and card reader CDx appears in the flow chart of FIGS. 4 and 5. Here, it is assumed that the customer is purchasing merchandise that may carry bar codes. However, the system is also applicable for purchase of services, rentals, or other valuables.

In step 104 of FIG. 4, the clerk enters the prices of the various pieces of merchandise, either by way of a keyboard (not shown) or a bar code reader BCRx, into the cash register CRx. In step 107, the cash register determines the total price. The customer then gives the clerk the cash to cover or exceed the total price. While this example refers to cash, the system is also applicable to payment by credit card. That is, the customer may wish to have an amount charged to the credit card in excess of the price in order to make donations or distributions according to an embodiment. For purposes of this description the word cash is used also to embrace credit card payments.

In step 110, the clerk then enters the amount of the cash payment into the cash register. Under normal circumstances, the cash payment will equal or exceed the total price. However, the system allows the donor to withdraw moneys from a credit balance in one of the accounts recorded in the central computer CC. While unlikely, this may also occur with a credit card sale. Thus, in some situations, the amount of cash may fall short of the total price. In step 114 the cash register determines in the amount of cash exceeds the total price.

If the answer is yes, the cash exceeds the sale price, the register CRx determines the amount of change by subtracting the price from the cash in step 117. If the answer is no, the cash does not exceed the sale price the register determines the amount due in step 120. In step 124, the cash register CRx asks whether the customer has and wishes to use a donor card. The clerk or customer may respond by keyboard, or directly by entering the donor card into the card reader CDx.

If the customer does not have or does not wish to use a donor card in response to step 124, the cash register CRx prints the transaction in step 127 and in step 130, prompts the clerk to make change or collect more cash. If the customer does not offer any needed cash the clerk must abort or otherwise correct the transaction.

If the customer wishes to use a donor card, the clerk may enters this information into the register's keyboard, or the customer may enter the card into the card reader CDx. In step 134, the register communicates with the central computer, and the two read the donor card. In step 137, the computer CC determines whether the card is valid. If not, the register CRx returns to step 127.

If the card is valid, the cash register CRx again asks if the cash offered exceeds the total price in step 140. If not, in step 144, the computer CC and the cash register CRx prompts the cash register CRx display DI to ask if the cash register should debit the deficient amount from one of the cardholder's accounts. If not, the process returns to step 127.

If the answer to step 144 is yes, the computer CC, in step 145, asks the customer to enter his or her personal identification (PIN) number. In step 146, the computer CC determines if the PIN number matches the card number. If not the computer returns to step 127. If yes, it determines if the card contains a sufficient balance to cover the amount due. If not, the process again returns to step 127. If yes, in step 150, the computer withdraws the money from the consumer's account and credits it to the merchant's account. In step 150, the cash register CRx also prints out the transaction.

If the answer to step 140, namely to the question whether there is more cash than the price, is yes, step 154 causes the cash register CRx to display a message asking whether the customer wishes to retain some of the change due. If yes, the cash register CRx and the computer CC prompt the customer to enter in the keypad KPx how much he or she wish to retain or donate. In step 157, the cash register CRx indicates to the clerk to give the appropriate net change and shows the net donor amount.

The process now goes to A in FIG. 5. If the answer to step 154 is no, the process also continues at point A in FIG. 5.

Figure 6:
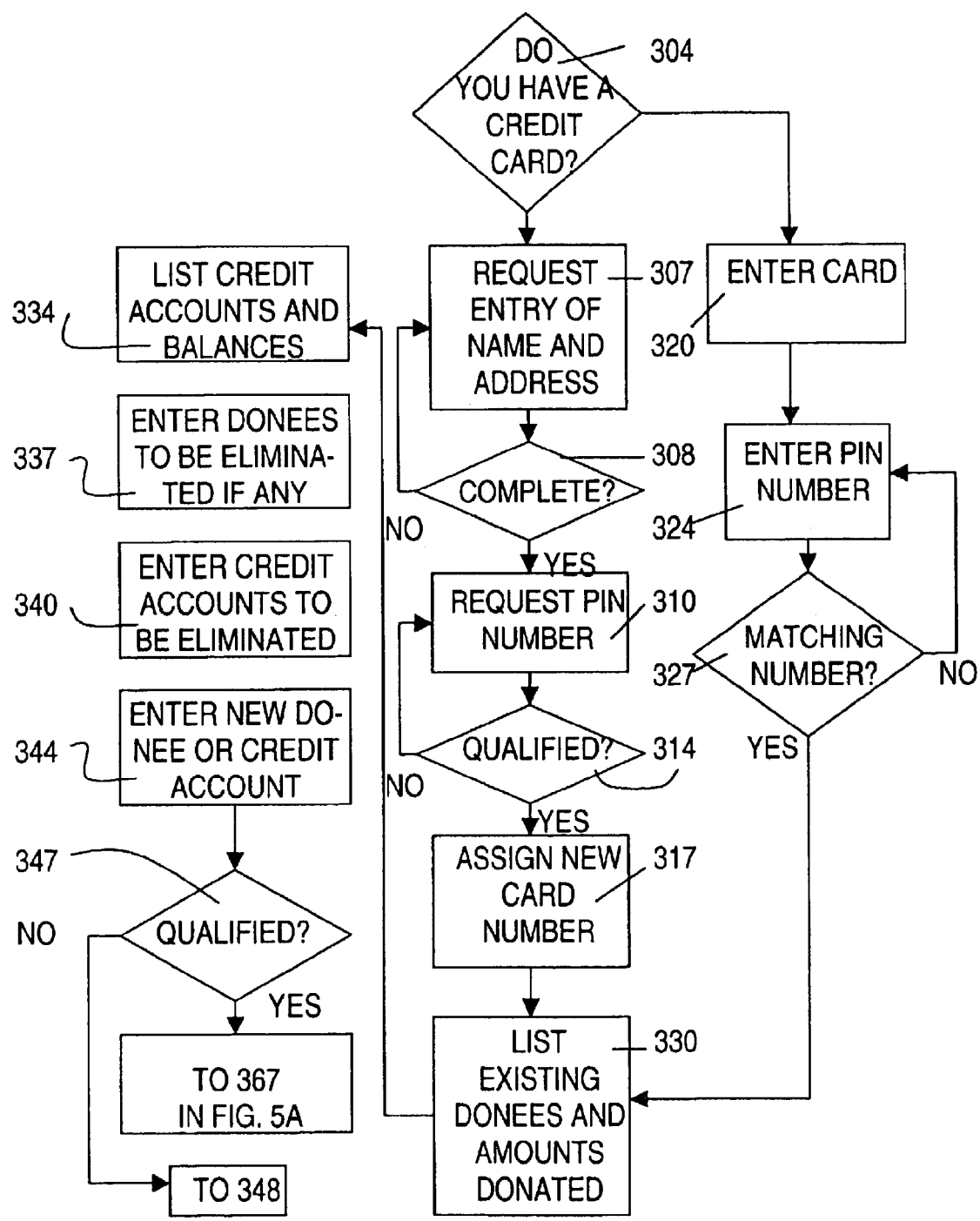
FIGS. 6 & 6A are flow diagrams of steps that take place in a computer in FIGS. 1 and 1A.
Figure 6A:
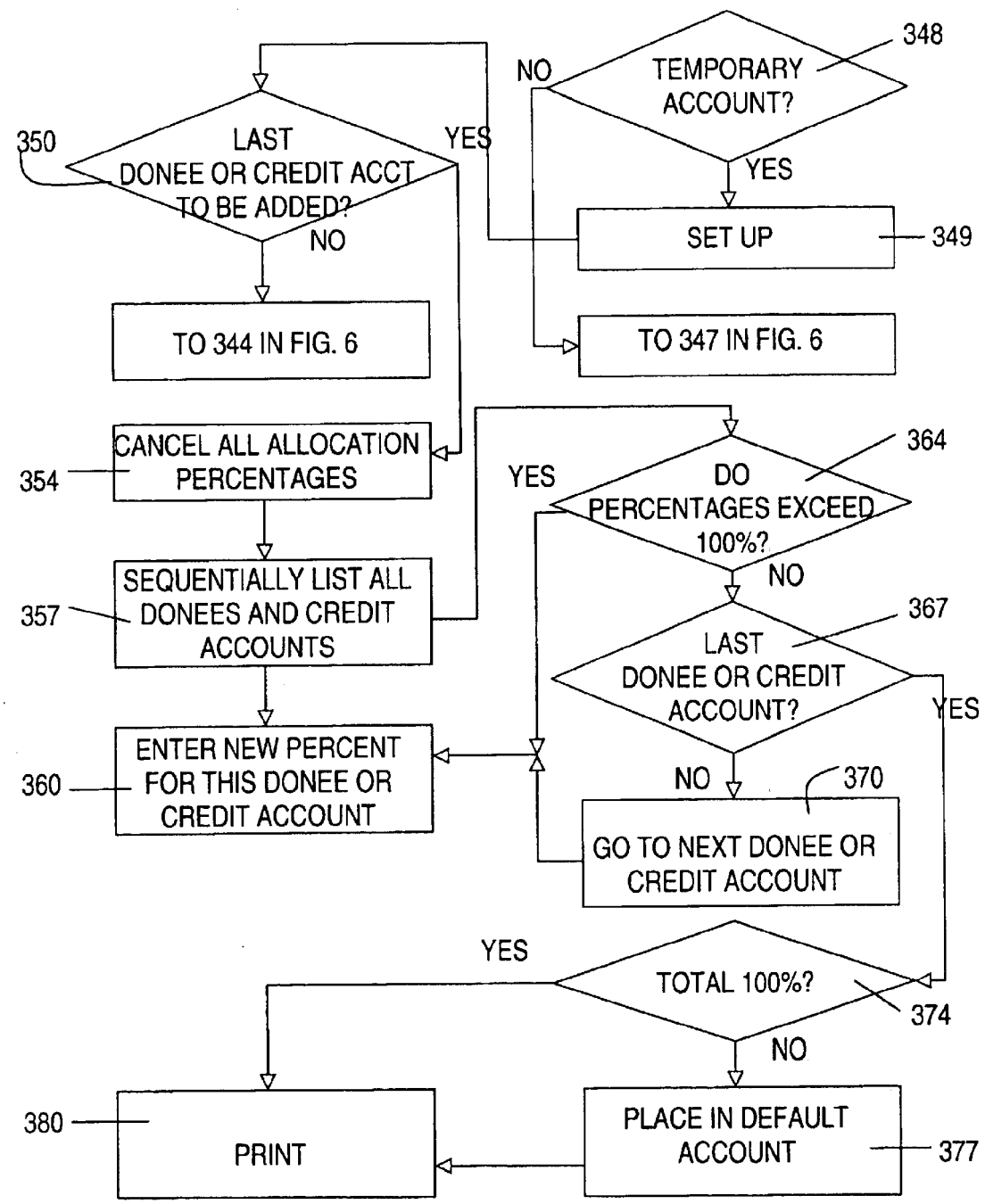

At A, step 204, in FIG. 5, the computer CC searches the records to find the pre-programmed payout amounts for the particular donor card. The payout amounts are entered as shown in FIG. 6. In step 207 of FIG. 5, the computer CC starts apportioning the payout amounts in the pre-programmed proportions or priorities and amounts. In steps 210 to 227 it enters the selected amounts in the accounts of various charities, banks, debit card, and vouchers. Normally there should be no remaining amount. However such an amount may exist. Thus in step 230 the computer CC asks if there remains any outstanding amount. If yes, step 234 enters it into a default account selected by the donor at an earlier time. In step 237, the computer CC updates the accounts both in its own data banks and in the computers CHy and OTz. The computers CHy and OTz confirm the transactions.

In a preferred embodiment, the computer CC transfers and credits charity donations to a charity account or to the charities CHy with each transaction. Hence the donation takes effect with each transaction.

If the answer to step 230 is no, there are outstanding amounts, the process goes to step 237 directly. In step 240, the cash register CRx prints out the amounts donated, entered into various accounts, the prices, the change, etc.

The computer CC and the cash register CRx then prompt the customer to ask if he or she wishes to change the programming of the various donations in the computer CC. If yes, the card reader CDx displays the apportionment and the amounts, including balances in step 247, the consumer then enters the desired chances in step 250, and the computer CC makes the changes in step 254. This ends the transaction in step 257. If the answer to step 244 is no, the process goes directly to step 257.

In one embodiment the consumer carries out steps 244 to 254 at a separate time in a separate card reader CDx and keypad KPx. This prevents the consumer from using these machines while the clerk serves another customer. In fact, the establishment may furnish a separate terminal RTx just for this purpose.

FIG. 6 is a flow chart which illustrates the steps which the computer CC takes, through the keypad KPx, to open or revise donor account or credit account data in a new or existing card account. A display DSx on the keypad KPx or the cash register CRx allows the computer CC to ask the consumer to perform certain acts. After the party has accessed the computer CC the computer, in step 304, asks whether the consumer has a donor card. If not, in step 307, the computer CC asks the consumer to enter his or her name or address. In step 308, the computer CC determines if all information has been entered. If not, it returns to step 307 to ask again for the desired information. If yes, the computer CC proceeds to step 310 to ask the consumer to choose a personal identification (PIN) number. In step 314, the computer determines if the PIN number is acceptable. If not it returns to step 310 for another number. If yes, the computer advances to step 317 to assign a new card number.

If the answer in step 304 yes, that the consumer has a card, the computer CC proceeds to step 320 to have the customer enter the card. In step 324, it asks the consumer to enter his or her preselected PIN number. In step 327 it determines whether the entered PIN number matches the preselected PIN number. If not, it returns to step 324 for a corrected number. The computer allows this procedure between steps 324 and 327 recur only three times, thereafter it aborts the program.

If the PIN number is correct and thereby qualified, the computer CC, in step 330 lists all existing donees and amounts donated during any specific time period, such as the calendar year. The consumer may request any time period. In step 334, it also lists all credit accounts with balances. In step 337 it asks the consumer to list all donee accounts to be eliminated, if any. In step 340 it asks the consumer to list all credit accounts to be eliminated if any. The computer then proceeds to step 344. Step 344 also receives a prompt from step 317 if the card number is new.

In step 344, the computer asks the consumer to enter any new donee account or credit account. In step 347, it determines if the donee, in the form of a charity, or credit institution, is in the list of charities or institutions that have been accepted by the system. If the answer is no, the computer, in step 348 asks if the consumer wishes to have a temporary account set up for that donee or credit institution pending investigation. If yes to step 348, the computer, in step 349, sets up a temporary account, and lists it as qualified pending investigation. If the answer to 348 is no, the computer CC goes back to step 347.

Once the computer CC has qualified a donee or credit institution, it goes to step 350 to ask if this is the last donee account or credit account the consumer wishes to add. If not the process goes back to step 344. If yes, the computer cancels all prior allocations in step 354 and, in step 357, sequentially lists all remaining and new donee account and credit accounts showing the old allocations where applicable. In step 360, it asks the consumer to enter a new percentage allocation for each account. As a check, in step 364, the computer asks if the total percentages exceed 100%. If yes, it returns to step 360 for a new entry. If not, it proceeds to step 367 to ask if this is the last account. If not it goes to step 370 to ask the consumer to go to the next account and returns to step 360. If yes, the computer CC goes to step 374 where it asks if the total percentage is 100%. If not, the computer CC places the remaining percentage in a consumer's personal default account asks the consumer to select an account and change to allocations in step 377. The computer, in step 380, ends the process and has the keypad print out the results.

According to another embodiment, the computer CC demands a PIN number each time the card is used. In another embodiment, the computer may permit others to donate in behalf of the card owner, such as a parent contributing for a child. In that case step 124 permits entry only of the card number without the card.

In some instances, when the amount of cash is less than the price, the sales establishment or customer may want to abort the sale. Then, at step 117, the cash register CRx asks whether to abort. If yes, the process must start again at step 104.

Figure 7:
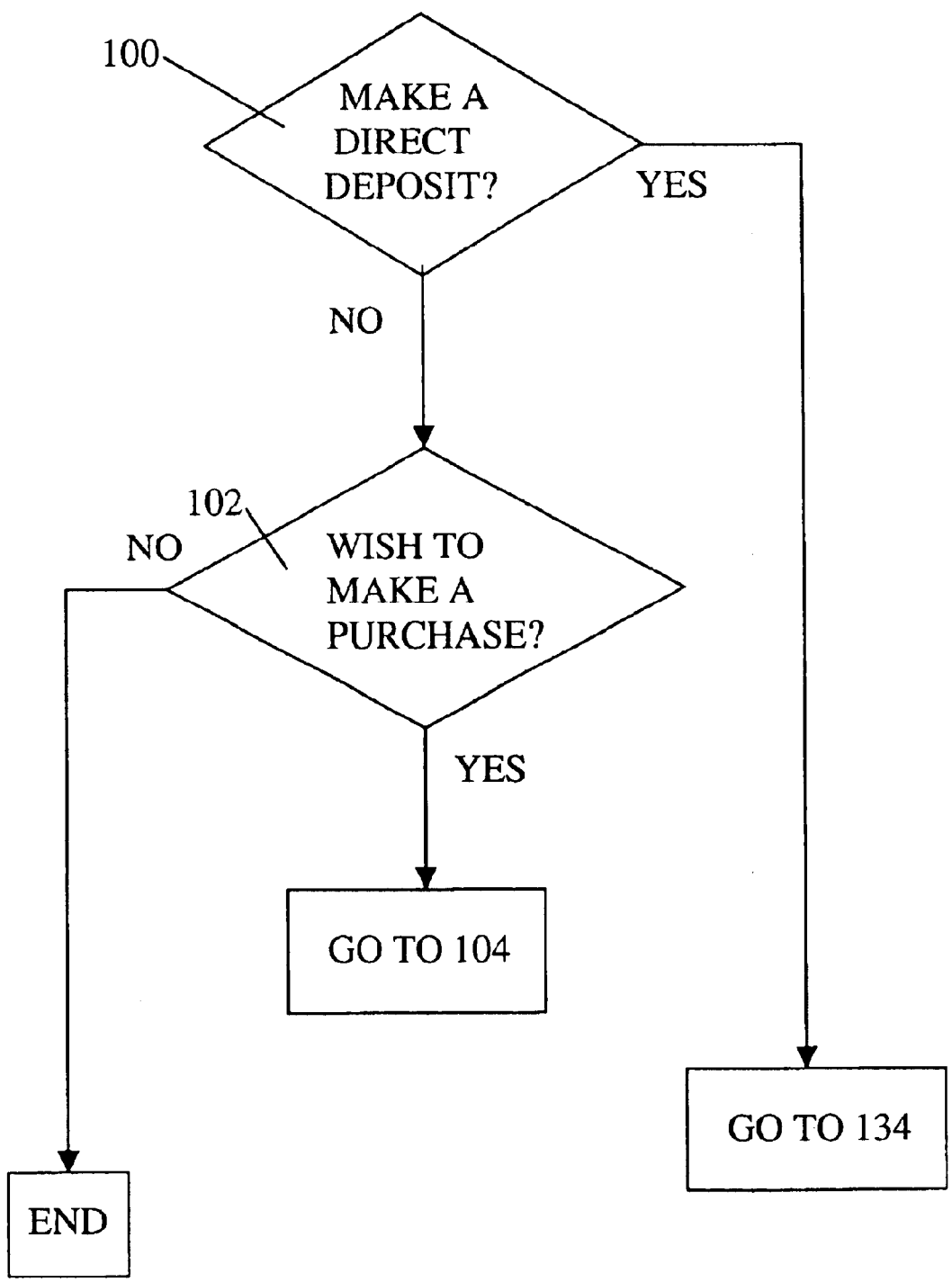
FIG. 7 is another flow diagram of the steps that take place in a computer in FIGS. 1 & 1A.

A variation of the embodiment of FIGS. 4, 4A, 5, and 5A appears in FIG. 7. Here, the process starts at step 100 where the system asks if the consumer wishes to make a direct transfer of cash into the system. If the answer is no, in step 102 the consumer is asked if he or she wishes to make a purchase. If the answer is yes, the system goes to step 104 in FIG. 4 to read the code on any items to be purchased. If the answer is step 100 is yes, the system goes to step 134 to read the card. If the answer to step 102 is no, the process ends.

Figure 7A:
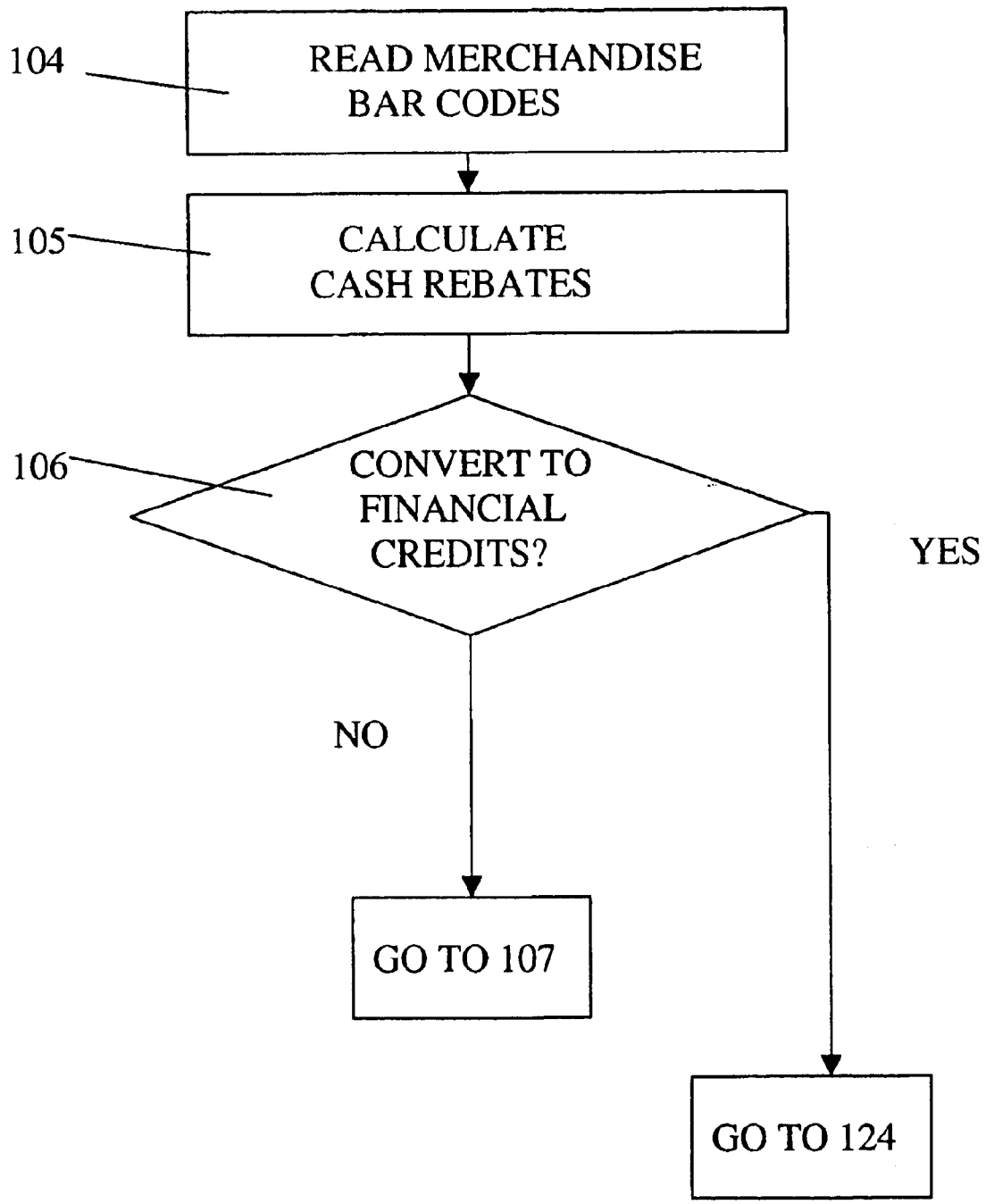
FIG. 7A is yet another flow diagram of the steps that take place in a computer in FIGS. 1 & 1A.

In another embodiment shown in FIG. 7A, after the cash register in step 104 of FIG. 4 reads the codes of all items to be purchased. In step 105 the cash register CRx of FIG. 1 or the remote input RIx in FIG. 1A, calculates the total amount of cash rebates (or coupons) due the consumer. In step 106 the consumer is asked if he or she wishes to have the total amount of cash rebates converted into financial credits for transfer to his or her account. If the answer is no, in step 107 the system determines the total price by subtracting the amount of rebates due the consumer. If the answer is yes, the cash amount from rebates will be entered into the system starting with step 124 of FIG. 4 where the consumer is asked to enter in their card or account identification number.

FIGS. 8.1A to 8.1E, 8.2, & 8.2A illustrate several embodiments. Of these figures, FIGS. 8.2 and 8.2A show a POS system.

In FIGS. 8.2 & 8.2A, the POS embodiments include a clearinghouse central computer (CCC) containing a central processor CPU and a large data storage DS. A communications system CS that may include telephone lines, satellites, or cables connects the CCC to a number of electronic cash registers (ECRx) (where x=1, ... M, ... N) in retail outlets, such as shops, supermarkets, gasoline stations, department stores, etc. at locations remote from the central computer. Throughout this specification, the term x, when appended to the end of a reference character, is equal to 1, ... M, ... N.

FIG. 8.2A is identical to FIG. 8.2 except that the cash registers CRx are replaced generally by remote inputs RI1 ... RIM ... RIN (RIx collectively). Examples of such inputs include cash registers, point of sale terminals, and draft capture machines. In the description below, reference to cash registers CRx also generally includes the remote inputs RIx.

In FIG. 8.1A, an "open" POS network embodies a four level spending/saving system comprised of Level 1 SP (multiple subscriber/payors), who tender excess payments or transfers excess funds to Level 2 MC (multiple merchant/collectors), who in turn make computer entry of data and funds for electronic transfer to Level 3 CCC (a singular managed clearinghouse central computer), who in turn transfers data and funds to Level 4 PA (multiple provider accounts), for the final purchase of products or services.

In FIG. 8.1A the excess funds are created at point of sale counters (POS) by the merchant/collectors (MC) who "front end" process the subscriber/payor (SP) spending transactions to determine the excess difference between the purchase price of goods or services and the amount of payment rendered.

After the amount of excess funds is determined by the MC's electronic cash register (ECR), the SP makes a transfer into a clearinghouse central computer (CCC) by providing a transaction card or an account number to the MC. The MC then swipes the card or enters the account number through an ECR or a draft capture remote terminal to record the time, the terminal location, the amount of funds entered, and the account number used. The terminal or cash register then prints out a receipt of the transaction and the MC returns the card and the receipt to the SP.

The input of individual transactions into the MC remote terminal can be completed in an "off-line" or "on-line" or a combination of both modes. At the completion of a specified period or amount, e.g. day, week, $50.00, the total off line transaction file stored in the MC terminal is then batched "on line" to the CCC (clearinghouse's central computer). The ability to process individual transactions in an off line mode is made possible due to the fact that the system does not require on line authorization, as in credit and debit card processing.

Each terminal location follows the same reporting procedure so that the CCC will have a record of all transactions made into the system, regardless of the location of the terminals. The files sent to the CCC contain details of each transaction by the identification of the account, the amount of the transfer, the date, and the terminal that accepted the transfer. The actual transfer of cash into the system starts when the MC sends the cash received from the SP into their bank for EFT transfer to the clearinghouse's bank account and concludes with the CCC EFT transferring funds to each listed PC (provider account) per the transaction records received from the merchant terminals. The transfer of cash from one account to the next is accomplished by the usual and customary bank EFT transferring through the ACH (Automatic Clearing House) or via EDI (Electronic Data Interchange).

Effectively, the system allows each SP the ability to make multiple transfers, in varied cross country locations, into terminals operated by unrelated parties, transferring as little as a penny in any one transaction, and often on a 24 hour demand basis.

The MC that operate the ECR terminals are at the time of operation both neutral and passive as to the selection of the consumer's provider(s), as well as not directing the distribution of funds to the consumer's provider(s). Only in this system are SP able to transfer their excess change created when dealing with multiple and diverse payees. The money is transferred into an "open" network that will pool and then transfer the once fragmented funds onto PA selected by the SP. In this system as compared to the existing state of art, the PA who will receive the transferred funds from the network need not also be the original collector of the transfers. Therefore, we have a "open" system that allows for a mix and match of diverse collectors and providers.

Under the system it is possible for one entity to provide both a collect or and provider role, but under different and autonomous points in the network cycle. For example, Sears may enroll a subscriber consumer in a Sears store account allowing the consumer to use their Sears issued mag stripe card to identify them when they enter excess change into any merchant/collector terminal. In this capacity Sears is playing the role of a distinct provider in the network. The card may then be used to transfer excess funds at fast food restaurants, convenience stores, other department stores, etc. Also the SP could go into any Sears store and enter excess funds into a Sears terminal for transfer to the network. On these occasions Sears would be playing a distinct role as a participating MC, within the network, and follow the same procedures as any other MC, as well as also being a PA at the end of the network chain.

In FIGS. 8.1B & 8.1C, the Clearinghouse Managed System (CMS) starts with Level 1, the subscriber/payors, tendering an excess financial payment to Level 2, merchant/collectors. They in turn enter the amount of the excess payment into an electronic cash register/remote terminals which then sends the funds and data on-line per transaction, or along with other transfers in a batched format, by a communication system to Level 3, clearinghouse central computer. Level 3 assigns the funds to an account previously opened by Level 1 SP through services provided by Level 3. The funds are then forwarded, when they reach pre-selected thresholds, by ACH (Automatic Clearing House) or EDI (Electronic Data Interface) transfer to Level 4, the provider accounts, selected by Level 1 SP.

The Clearinghouse Managed System (CMS), has the network providing a more active role by the system's central computer enrolling the SP in accounts and then assuming the role of an account manager. Under this arrangement the network will direct the overall operation of the system, issue transaction cards (bar code, mag stripe and/or "smart" cards or devices), operate the system's central computer, provide both on-line and off-line communications between the POS terminals and the central computer, accept funds, assume fiscal responsibility for the SP funds on account, maintain all account records, provide all outside payments to parties selected by the SP, and even allow the SP the ability to access their accounts for the purpose of receiving credit at the time of POS purchase to pay the MC. Under the CMS, in addition to the network serving as an account manager, it will also appoint banks, credit card institutions, and merchant/collectors to assume additional fiduciary responsibilities.

In FIGS. 8.1D & 8.1E, the Provider Managed System (PMS) starts with Level 1, the subscriber/payors, tendering an excess financial payment to Level 2, merchant/collectors. They in turn enter the amount of the excess payment into an electronic cash register/remote terminals which then preferably send the funds and data, along with other transfers in a batched format, by a communication system to Level 3, clearinghouse central computer. Level 3 then segregates the transactions per provider accounts. The data and funds are then forwarded, when they reach pre-selected thresholds, by ACH (Automatic Clearing House) or EDI (Electronic Data Interface) transfer to the Level 4 providers for account management and final distribution. Level 1 SP initially join the network by enrolling in accounts with Level 4 providers.

The Provider Managed System (PMS), is an "open" system that creates a network whereupon SP will directly enroll in accounts managed by PA, receive mag stripe cards issued by the PA, and enter their excess change at POS locations to be transferred by the MC to a neutral network clearinghouse (CCC). Under the PMS, the CCC will accept and process the transaction data and funds and forward both to the PA according to the card identification. The PA will then manage the accounts per the SP instructions.

In the PMS scenario both the merchant MC and the clearinghouse CCC are passive as to the opening of accounts and the SP selections of the final distribution of the funds. Here both the payees and the clearinghouse transfer both the cash and transaction records onto the end PA.

Also under the PMS embodiment, once the funds are received by the PA, who can be banks, insurance companies, security firms, merchandisers, travel agencies, charitable institutions, etc., the SP will determine how to spend the savings for services and/or products.

In FIG. 8.1F, in both the Clearinghouse Managed System or Provider Managed System the data transfer is sent via a proprietary network from Level 2 MC to Level 3. After processing by Level 3 selected data is sent via a proprietary network to Level 4. On the funds transfer side Level 1 enters the funds at Level 2 outlets. Level 2 credits the funds into the MC's bank account and by ACH (Automatic Clearing House) or EDI the funds are transferred to Level 3's bank account for final ACH or EDI to Level 4's bank account.

The ECRx cash registers are connected to respective keypads KPx and card readers CDx. Along with other components together they constitute a remote terminal RT or as in FIG. 8.2A a remote input RIx that is connected to a variety of central computers.

In the CMS embodiment the accounts are managed in the CCC of FIGS. 8.2 & 8.2A. Money is collected at the ECRx for crediting to the consumers' ledgers in the accounts of various charities and other institutions such as banks, travel agencies, mutual fund issuers, debit card issuers, credit card issuers, etc. The data storage DS contains individual storage for charity accounts CA and other accounts OA, such as for banks etc., all with ledgers for individual consumers.

In the PMS embodiment the CCC acts as a clearinghouse and transfers all data and funds onto the respective PA for account management and final distribution.

The CCC communications system CS also connects the CCC to charity computers CHy and other computer OCz, where y=1 . . . k, and z=1 . . . j such as bank computers, merchandise computers, debit account holders, credit card issuers, etc. These charities and other institutions are the ultimate receivers of the donations and transfers collected at the electronic cash registers ECRx. The CCC also includes a default account DA with consumer ledgers to hold moneys not otherwise allocated.

The ECRx includes a change display for exhibiting cash transactions, credit cards, or check purchases. The display automatically operates to show numbers in question. A card reader CDx with a keypad KPx allows the SP or clerk to enter the transfer directly. The keypad KPx permits the SP to change the allocation for this transaction alone or permanently. The keypad KPx also allows the SP to reduce the amount transferred so that he can receive cash change. The terminal RTx or ECRx reports the transfer directly to the CCC via the communication system CS. The CCC prints out periodic reports for interested parties on a need-to-know basis.

According to an embodiment, a consumer in a shop, supermarket, gasoline station, department store, etc. selects the desired merchandise and brings them to a clerk. The clerk inputs the price of all items in a ECRx by way of a register keyboard or a bar code reader and the register totals the price. The consumer-offers the clerk either the exact amount of cash or a sum exceeding the price. Then the clerk enters that cash and the amount into the cash register. The ECR subtracts the price from the cash.

If the consumer gives the clerk the exact price nothing more need happen. However, if the money offered the clerk exceeds the price, the consumer may, if he or she wishes, choose to receive the change or to donate or transfer all or a portion of the change. To do the latter, he or she enters a card number into the keypad KPx or enters the card itself into the card reader CDx. The latter reads the number from a bar code or magnetic stripe on the card. The consumer can also enter into the keypad how much of the total change, he or she is to receive, should be credited to various predetermined accounts in the CCC. The register ECRx reads the numbers entered into the keyboard or the number entered by way of the card reader CDx.

In addition if SP wish to make a direct transfer of funds into the network, (rather than make a purchase and tender excess funds), all that is necessary is to enter the amount transferred into the ECRx and the funds will be transferred to the CCC.

A transaction card DC1 according to an embodiment appears in FIG. 8.3 with a magnetic stripe MS carrying the donor's number. A card DC2 in FIG. 8.3 includes the number in the form of a bar code BC. In another embodiment of the system, the card may be a smart card. Also in regard to the use of bar codes, the codes may be incorporated in the design of a key chain device or displayed on windshields or car windows to allow the system to be accessed under a variety circumstances, i.e., drive through window, toll booth, etc.

After receiving the data, the ECR accesses the CCC. The latter allocates the change, a portion of the change, or the amount of a direct transfer provided by the SP among various charity accounts CA and other accounts OA in the CCC. The distributions to various accounts are preprogrammed commands which the consumer has previously instructed the CCC to complete. For each transfer or donation made, the SP receives a printed receipt of the transaction from the ECRx or RTx.

If desired, the consumer can choose to enter in only a fraction of the difference between the cash presented and the price. The consumer then enters the amount to be transferred and receives the appropriate cash change.

According to another embodiment with every transaction, the computer electronically transfers all amounts allocated to each charity CHy immediately, as soon as the computer can access the charity computer, or when there is a sufficient amount of money. In this way the donor is always assured that the contribution takes effect. Transfers in the other accounts OA may be sent immediately or held until a sufficient amount is accumulated to be acceptable by the other institutions.

An example of the operation of the CMS embodiment appears in the flow chart processed by Level 2 MC would then be stored in memory and transferred in a batched format to Level 3 CCC at periodic intervals. In FIGS. 8.4A & 8.4B it is assumed that the customer is purchasing merchandise that may carry bar codes. However, the system is also applicable for purchase of services, rentals or other valuables.

In step 8104 of FIG. 8.4A, the clerk enters the prices of the various pieces of merchandise, either by way of a keyboard (not shown) or a bar code reader BCRx, into the cash register ECR. In step 8107, the cash register determines the total price. The customer then gives the clerk the cash to cover or exceed the total price. While this example refers to cash, the system is also applicable to payment by check, credit or debit card. That is, the customer may wish to have an amount charged to the checking account, credit or debit card in excess of the price in order to make donations or distributions according to the system. For purposes of this description the word cash is used also to embrace check, credit or debit card payments.

In step 8110, the clerk then enters the amount of the cash payment into the ECRx. Under normal circumstances, the cash payment will equal or exceed the total spending price unless there is transfer of cash into the system without a purchase. However, the system allows the SP to withdraw moneys from a credit balance in one of the accounts recorded in the CCC. While unlikely, this may also occur with a credit or debit card sale. Thus, in some situations, the amount of cash may fall short of the total price. In step 8114 the cash register determines if the amount of cash exceeds the total price.

If the answer is yes, the cash exceeds the sale price, the ECRx determines the amount of change by subtracting the price from the cash in step 8117. If the answer is no, the cash does not exceed the sale price, the register determines the amount due in step 8120. In step 8124, the cash register ECRx asks whether the customer has and wishes to use a network card. The clerk or customer may respond by keyboard, or directly by entering the card into the card reader CDx.

If the customer does not have or does not wish to use a network card in response to step 8124, the cash register ECRx prints the transaction in step 8127 and in step 8130, prompts the clerk to make change or collect more cash. If the customer does not offer any needed cash the clerk must abort or otherwise correct the transaction.

If the customer wishes to use a network card, the clerk may enter this information into the register's keyboard, or the customer may enter the card into the card reader CDx. In step 8134, the ECRx reads the network card. In FIG. 8.4B in step 8137, the ECRx determines whether the card is valid. If not, the register ECRx returns to step 8127.

If the card is valid, the ECR again asks if the cash offered exceeds the total price in step 8140. If not, in step 8144, the ECR prompts the cash register CR display DS to ask if the cash register should debit the deficient amount from one of the SP cardholder's accounts. If not, the process returns to step 8127.

If the answer to step 8144 is yes, the computer CCC, in step 8145, asks the customer to enter his or her personal identification (PIN) number. In step 8146, the CCC determines if the PIN number matches the card number. If not, the computer returns to step 8127. If yes, it determines if the card contains a sufficient balance to cover the amount due. If not, the process again returns to step 8127. If yes in step 8150, the computer withdraws the money from the card account and credits it to the merchant's account. In step 8150 the cash register ECRx also prints out the transaction.

If the answer to step 8140, namely to the question whether there is more cash than the price, is yes, step 8154 causes the ECR to display a message asking whether the customer wishes to retain some of the change due. If yes, the ECR prompts the customer to enter into the keypad KPx how much he or she wishes to retain transfer. In FIG. 8.4C in step 8157, the cash register ECR indicates to the clerk to give the appropriate net change and shows the net transfer amount.

The process now goes to A in FIG. 8.4D. If the answer to step 8154 is no, the process also continues at point A in FIG. 8.4D.

At A, step 8204, in FIG. 8.4D the CCC searches the records to find the pre-programmed pay out amounts for the particular network card. The pay out amounts are entered as shown in FIG. 8.4.D. In step 8207 of FIG. 8.4D, the CCC starts apportioning the pay out amounts in the preprogrammed proportions by priorities and amounts. In steps 8210 to 8227 it enters the selected amounts in the accounts of various charities, banks, debit card, and vouchers. Normally there should be no remaining amount. However, such an amount may exist. Thus in step 8230 the CCC asks if there remains any outstanding amount. If yes, step 8234 enters it into a default account selected by the SP at an earlier time. In step 8237, the CCC updates the accounts both in its own data banks and in the computers CHy and OCz. The computers CHy and OCz confirm the transactions.

If the answer to step 8230 is no, there are outstanding amounts, the process goes to step 8237 directly. In step 8240 the ECRx prints out the amounts transferred, entered into various accounts, the prices, the chance, etc.

The CCC and the ECRx then prompt the customer in step 8244 to ask if he or she wishes to change the programming of the various accounts in the CCC. If yes, the card reader CDx or the CCC displays the apportionment and the amounts, including balances in step 8247, the consumer then enters the desired changes in step 8250, and the CCC or the card reader makes the changes in step 8254. This ends the transaction in step 8257. If the answer to step 8244 is no, the process goes directly to step 8257.

In one embodiment the consumer carries out steps 8244 to 8254 at a separate time in a separate card reader CDx and keypad KPx. This prevents the consumer from using these machines while the clerk serves another customer. In fact, the establishment may furnish a separate terminal RTx just for this purpose.

Prior to listing in the CCC, the system qualifies each charity for their tax exempt status, operations, management activities, litigation, and other pertinent legal and financial information. The charity must certify to the facts. If the reported information meets the requirement, the charity qualifies. The CCC initiates a checking and updating of the qualification facts on a regular basis. The CCC keeps the qualified charities current on an ongoing basis.

The register furnishes the SP with a printed receipt of each donation for tax purposes and authentication that the charity will receive the money. In an on line mode the receipt can show the date, outlet location, serial number, amount donated, total donated to date, and the current financial results of any specific campaigns or projects received by the charity overall.

One embodiment of the system furnishes other rewards to the donor. For example, the terminal may play a tune, such as "It's a Small World" in response to a donation to the United Nations children's fund. Alternatively, the donor may receive a message that the last ten cent donation has closed another $100 unit in donations to this charity and provide a special discount coupon. As another example the donor may receive a message that the donor's contribution is being matched by an independent-sponsor with a bonus donation.

An example of the operation of the PMS embodiment appears in the flow chart of FIGS. 8.5A & 8.5B. In the PMS embodiment, the opening and closing of accounts is assumed by PA central computers. This flow chart depicts an off line version of the PMS embodiment in which transactions are processed at Level 2 MC and then stored in memory and transferred via a batched format to Level 3 CCC at periodic intervals. Level 3 would then sort the transactions according to Level 4 account origination and forward said transactions to Level 4. The PMS, however, could also be operated in an on line mode and the transactions would then be processed by a smart card or on line with a central computer located at Level 3 or 4.

Referring, now to FIGS. 8.5A & 8.5B, there is a flow chart which illustrates the steps which the PMS processes transactions made through ECRx at Level 2 MC.

Beginning at the top, in step 8300, the remote terminal at the POS counter stands ready to receive input and is also scrolling information messages on how to use the system.

In step 8302, the clerk inputs the price of each item into ECRx by a bar code reader or by keypad.

In step 8304, the terminal computer totals the price of all of the items.

In step 8306, the clerk enters the amount of payment, on most occasions cash, into the terminal computer. However, if a check, debit or credit card is tendered by the SP, any excess payment effectively becomes cash and is therefore eligible for transfer.

In step 8303, the terminal computer asks if the amount tendered is more than the total purchase price.

If no and the number is zero, the terminal computer goes to step 8310 and a receipt is printed out. In step 8312 the transaction would end and the terminal computer returns to step 8300 for new transactions.

If yes, in step 8314 the terminal computer calculates the difference and displays the value and goes to step 8316. In step 8316 the terminal computer asks if the consumer wishes to use the system.

If the answer is no, in step 8318 a receipt is printed out, and in step 8320 the transaction is ended and the terminal computer returns to step 8300.

If the answer to step 8316 is yes, in step 8322 the terminal computer asks if you are a subscriber?

If the answer is no, step 8324 allows a non-subscriber to use the system by asking the clerk to enter in a generic access code. On these occasions, most likely, the non-subscriber will be making a donation for charitable purposes. At this time in step 8326, the non-subscriber will pick from a list of approved charities and the clerk will key in the selection. In step 8328 a receipt will be printed showing evidence of the contribution. This same receipt will also provide an audit trail for individuals and or organizations to confirm that the charitable institutions received the donation. In step 8330 the transaction would end and the terminal computer returns to step 8300.

Referring now to FIG. 8.5B if the answer is yes, in step 8332 the subscriber or the clerk enters the subscriber's card into the terminal. The terminal computer reads the card and automatically records all of the cents in the POS change as a transfer or contribution. If the subscriber wishes to add in all of the change (coins and bills) 8332A is entered into the computer. If the subscriber wishes to add in a specified portion of the change, 8332B is prompted into the keypad along with the specified amount, for example $1.54 out of $2.54 in available change.

In step 8334, the terminal computer asks if the subscriber wishes to bypass their default instructions for charities and select a special charity for this transaction.

In step 8336 if the answer is no, the terminal computer advances to step 8340.

If yes in 8334, in step 8338 the bypass charity account number is entered into the terminal computer through the keypad.

In step 8340 the subscriber will receive a receipt showing their donor contribution.

In step 8342 the terminal computer writes the transaction into memory. In step 8344 the transaction would end and the terminal computer returns to step 8300.

In step 8346, on a programmed time basis, the terminal computer forwards, by modem, the batch transactions held in memory to Level 3 CCC.

In order to enroll in the CMS embodiment, SP would sign up for accounts with Level 3 CCC. In order to enroll in the PMS embodiment, SP would sign up for accounts with Level 4 PA.

FIGS. 8.6A & 8.6B are flow charts that illustrate the enrollment steps for a CMS or PMS account which a central computer takes, through the keypad KPx, to open or revise an SP account. A display DSx on the keypad KPx or the ECRx allows a central computer to ask the consumer to perform certain acts. After the party has accessed the computer, in step 8404, it asks whether the consumer has a network card. If no in step 8407, the computer asks the consumer to enter his or her name or address. In step 8408 the computer determines if all information has been entered. If not, it returns to step 8407 to ask again for the desired information. If yes, the computer proceeds to step 8410 to ask the consumer to choose a personal identification (PIN) number. In step 8414 the computer determines if the PIN number is acceptable. If not, it returns to step 8410 for another number. If yes, the computer advances to step 8417 to assign a new card number.

If the answer in step 8404 is yes, that the consumer has a card, the computer proceeds to step 8420 to have the customer enter the card. In step 8424 it asks the consumer to enter his or her pre-selected PIN number. In step 8427 it determines whether the entered PIN number matches the pre-selected PIN number. If not, it returns to step 8424 for a corrected number. The computer allows this procedure between steps 8424 and 8427 to occur only three times, thereafter it aborts the program.

If the PIN number is correct and thereby qualified, the computer in step 8430 lists all existing accounts and amounts transferred during any specific time period, such as the calendar year. The consumer may request any time period. In step 8434 it also lists all accounts with balances. In FIG. 8.6B in step 8437 the consumer lists all accounts to be eliminated, if any. In step 8440 the consumer lists any accounts to be added if any. Step 8440 also receives a prompt from step 8417 if the card number is new.

In step 8447 it determines if the account, in the form of a charity, merchant, or institution, is in the list of charities or institutions that have been accepted by the system. If the answer is no, the computer in step 8448 asks if the consumer wishes to have a temporary account set up for that donee or institution pending investigation. If yes to step 8448, the computer in step 8449 sets up a temporary account, and lists it as qualified pending investigation. If the answer to 8448 is no, the computer goes back to step 8447.

Once the computer has qualified a donee or institution, it goes to step 8450 to ask if this is the last account the consumer wishes to add. If not, the process goes back to step 8444. If yes, the computer cancels all prior allocations in step 8454 and in step 8457 sequentially lists all remaining and new accounts showing the old allocations where applicable. In step 8460 it asks the consumer to enter a new percentage allocation for each account. As a check, in step 8464, the computer asks if the total percentages exceed 100%. If yes, it returns to step 8460 for a new entry. If not, it proceeds to step 8467 to ask if this is the last account. If not, it goes to step 8470. The computer then goes to step 8474 where it asks if the total percentage is 100%. If not, the computer places the remaining percentage in a consumer's personal default account and asks the consumer to select accounts and change allocations in step 8477. The computer in step 8480 ends the process and prints out the results.

Figure 9:
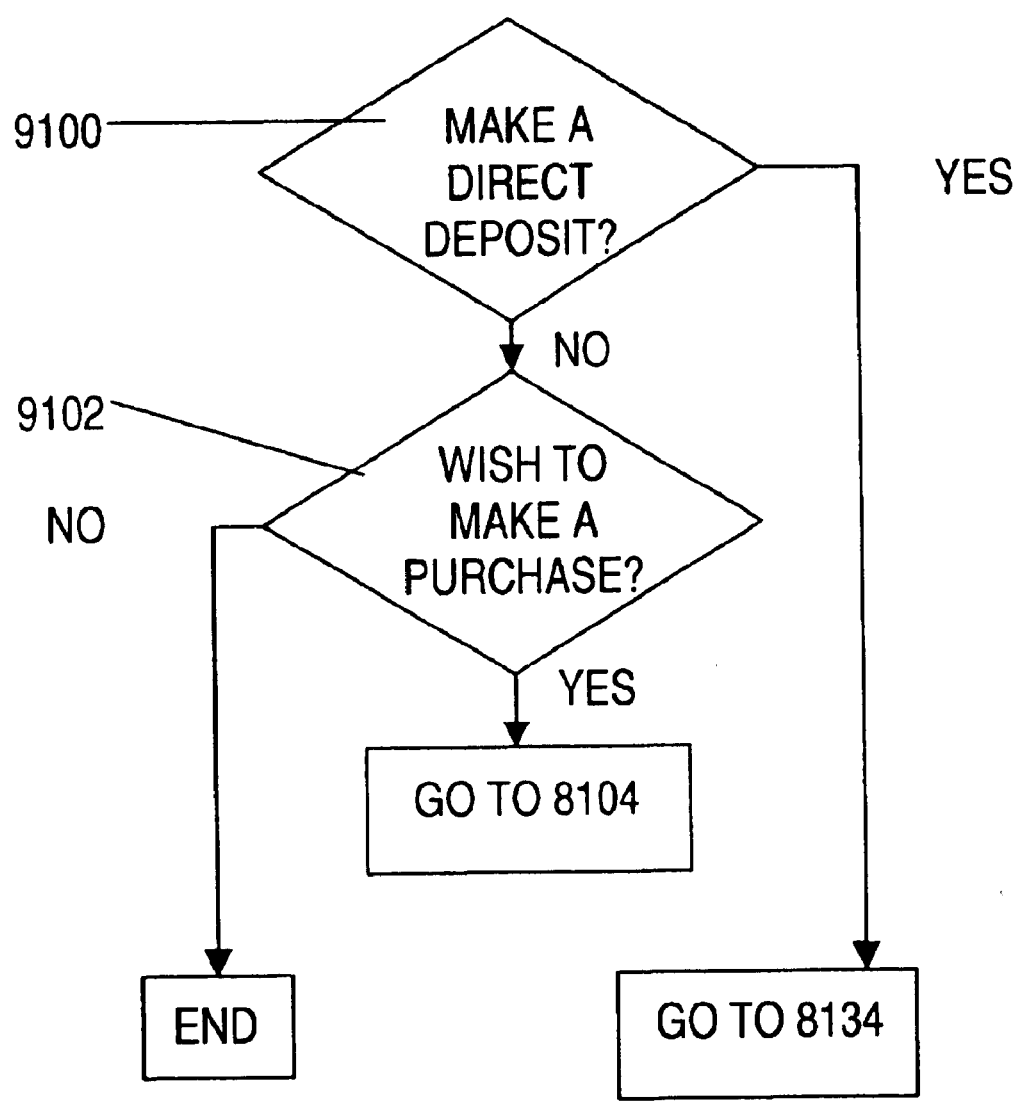
FIG. 9 is a flow diagram of the steps that take place in a computer in FIGS. 8.1B, 8.1C, 8.2, & 8.2A.

To make a direct transfer of funds into the network of FIG. 9 (rather then make a purchase and tender excess funds), all that is necessary is to enter the amount transferred into the ECRx and the funds will be transferred to the Clearing House Central Computer CCC of FIG. 8.2. This is accomplished as shown in FIG. 9 which is similar to FIG. 7. Here, the process starts in step 9100, where the system asks if the consumer wishes to make a direct transfer of cash into the system. If the answer is no, in step 9102 the consumer is asked if he or she wishes to make a purchase. If the answer is yes, the system goes to step 8104 in FIG. 8.4A to read the code on any items to be purchased. If the answer is step 9100 is yes, the system goes to step 8134 to read the card. If the answer to step 9102 is no, the process ends.

The system contrasts with present day situations in which a clerk inputs the price of all items in the cash register and the latter totals the price. The consumer offers either the exact amount of cash or a sum exceeding the price, and the clerk enters that amount. The cash register then subtracts the price from the cash.

According to the system, the clerk also inputs the price of all items in the cash register and the latter totals the price. The consumer still offers either the exact amount of cash or a sum exceeding the price, and the clerk enters that amount. The cash register then subtracts the price from the cash. However, then the consumer enters their identification account number or card with its bar code or magnetic stripe. The register then contacts the remote processing unit and the latter allocates the change according to the preprogrammed commands which the consumer has previously entered. The consumer receives a printout of all donor transactions as well as the just-completed commercial transaction.

If desired, the consumer can choose to donate only a fraction of the difference between the cash presented and the price. The consumer then enters the amount to be donated and receives the appropriate cash change.

Prior to listing in the central processor, the system qualifies each charity for their tax exempt status, operations, management activities, litigation, and other pertinent legal and financial information. The charity must certify to the facts. If the reported information meets the requirement, the charity qualifies. The computer initiates a checking and updating of the qualification facts on a regular basis. The central processor the keeps the qualified charities on an ongoing basis.

In another example a consumer may enter their discretionary fund at the POS to go to their account for assignment to a number of accounts nonprofits, mutual funds, travel services, banks, etc.

The register furnishes the donor a printed receipt of each donor transaction for tax purposes and authentication that the charity will receive the money. The receipt shows the serial number, amount donated, date, total donated by the donor, and the current financial results of any specific campaigns or project received by the charity overall.

One embodiment of the system furnishes other rewards to the donor. For example, the terminal may play a tune, such as "It's a Small World" in response to donation to the United Nations children's fund. Alternatively the donor may receive a message that the last ten cent donation has closed another $100 units in donations to this charity and provide a special discount coupon. As another example the donor may receive a message that the donor's contribution is being matched by a sponsor with a bonus donation.

The system supervises, implements, and coordinates charitable contributions to benefit all participants in the giving cycle, including the donors, sponsors, charitable organizations, Internal Revenue Service, and end recipients. It allows remote receiving and sending stations, connected to a central processing station, to accept any denomination of giving from a single penny to unlimited dollars. Regardless of the size of the donation, it effectively warrants that all participants that the designated charity has received the donated funds. It thus supports the authenticity of each donation. It can offer unlimited access to the donors concerning their contributions to charities and savings accounts, the intended use of the funds, and feedback concerning the total received by the funds.

The system effectively leverages the power of mere pennies into substantial dollars that in turn become available to charities on a short term collection basis. It rewards and encourages philanthropic giving and savings to all individuals on an every day basis.

The system adds new features to old ways of doing business thus providing consumers, merchants, payees, and payors with new benefits. The system uniquely removes the problems consumers have in dealing with the nuisance of loose change, allows consumers to save or donate every time they spend, provides consumers with an improved way to purchase goods or services on a 'lay-a-way' or pre-purchase plan, provides financial institutions with an improved way to maintain or increase their customers' account balances, and provides nonprofits with an improved way to raise needed funds.

While embodiments of the system have been described in detail, it will be evident to those skilled in the art that the system may be embodied otherwise without departing from its spirit and scope

What is claimed is:

1. A system, comprising:
   a remote input;
   entry means in the remote input for receiving entry of an offered amount being offered by a transactor and a second amount;
   calculating means in the remote input for recording any excess of the offered amount relative to the second amount or the second amount relative to the offered amount;
   entering means for entering an identifier that identifies the transactor;
   applying means responsive to said remote input and said identifier entering means for applying at least a part of the excess as a credit or debit to an account predetermined on the basis of said identifier, wherein the account in which the excess is placed is determined by the transactor; and
   said account being identified independent of data in the remote input.

2. A system as in claim 1, wherein applying means includes apportioning means for apportioning at least part of the excess to one or more accounts predetermined on the basis of said identifier.

3. A system as in claim 2, wherein said remote input means includes a display for displaying the excess and remains.

4. A system as in claim 2, wherein printout means prints out the status one or more accounts.

5. A system as in claim 2, wherein said identifier entering means includes means for entering changes in the apportionment.

6. A system as in claim 2, wherein said apportioning means includes means for allocating a portion of the excess to charity donee accounts with each apportionment.

7. A system as in claim 6, wherein said apportioning means includes means for transferring the portion of the excess for the charity donee account directly to the charity donee with each apportionment.

8. A system as in claim 2, wherein said apportionment means includes:
   charity storage means for storing names of a plurality of qualified charities;
   bank storage means for storing names of a number of banks;
   account storage means for storing numbers of client accounts;
   entry means for entering the names of charities and banks so as to establish an entered name for each entry of a name;
   comparison means responsive to said storage means and said entry means for comparing each entered name with a stored name to determine if the entered name matches a stored name;
   assignment means responsive to said comparison means for assigning a charity or a bank to an account when the charity or the bank has been entered;
   recording means responsive to said account storage means for recording money entries into one or more said accounts; and
   allocating means responsive to said account storage means for registering an allocation of parts of monies recorded into one or more accounts among the charities and banks entered for that account.

9. A system as in claim 1, wherein said identifier means includes receiving means for receiving a card having data including the account.

10. A system as in claim 9, wherein said apportioning means includes a central processor remote from the entry means for receiving data from the entry means.

11. A system as in claim 1, further comprising printout means coupled to said entry means, said entering means, and said applying means for printing out the amount or amounts entered and applied.

12. A system as in claim 2, wherein the identifier indicates the relationship of apportioning among an account or accounts independent of the of data in the entry means.

13. In a computer system, a point of sale operating method, comprising:
    entering a number corresponding to a price of a product into a remote input; entering an amount corresponding to an amount being offered;
    determining any excess of the amount relative to the price or the price relative to the amount;
    entering a coded identifier;
    applying at least a part of the excess to an account as established by the coded identifier; and
    crediting or debiting the excess to the account established by the coded identifier, wherein the account in which the excess is applied is determined by the transactor;
    the account being identified with said coded identifier being independent of said remote input.

14. A method as in claim 13, wherein said applying step returns any remains from the excess, after applying.

15. A method as in claim 13, wherein said applying step includes an apportioning step for apportioning at least a part of the excess to one or more accounts determined by the coded identifier.

16. A method as in claim 15, wherein said step of apportioning includes entering changes in the apportionment.

17. A method as in claim 15, wherein said step of apportioning includes allocating a portion of the excess to one or more charity donee accounts with each apportionment.

18. A method as in claim 17, wherein said apportioning step includes transferring a portion of the excess for a charity donee account directly to a charity donee with each apportionment.

19. A system as in claim 2, wherein said apportioning means includes a central processor remote from the entry means for receiving the data from the entering means.

20. A system, comprising:
    an entry station for entering an amount corresponding to a sum being offered in a transaction and an amount being asked in the transaction;
    said entry station including a code reader or a keyboard for receiving an identifier that identifies a transactor in the transaction;
    a calculating device in the remote input for recording an excess from amounts in the transaction;
    a processor remote from said entry station and responsive to said code reader or keyboard for applying at least apart of the excess as a credit or debit to an account or accounts on the basis of said identifier of said transactor, wherein the account in which the excess is placed is determined by the transactor; and said account or accounts being identified independent of data in the remote input.

21. A system as in claim 1, wherein cash from a coupon or rebate is converted into financial credits for transfer to one predetermined account.

22. A system as in claim 1, wherein cash from a coupon or rebate is converted into financial credits for transfer to one or more predetermined accounts.

23. A method as in claim 13, wherein cash from a coupon or rebate is converted into financial credits for transfer to one predetermined account.

24. A method as in claim 13, wherein cash from a coupon or rebate is converted into financial credits for transfer to one or more predetermined accounts.

25. A system as in claim 1, wherein the transactor makes a direct deposit into one predetermined account.

26. A system as in claim 1, wherein the transactor makes a direct deposit into one or more predetermined accounts.

27. A method as in claim 13, wherein the transactor makes a direct deposit into one predetermined account.

28. A method as in claim 13, wherein the transactor makes a direct deposit into one or more predetermined accounts.

29. A system as in claim 1, wherein said account predetermined on the basis of said identifier is a default account.

30. A method as in claim 13, wherein the step of applying at least a part of the excess to an account as determined by the coded identifier includes the account being a default account.

31. A system as in claim 1, wherein said identifier is a PIN number.

32. A method as in claim 13, wherein the step of entering a card identifier includes entering a PIN number.

33. A system as in claim 1, wherein said entering means for entering an identifier that identifies the transactor includes a sensor responsive to electromagnetic radiation.

34. A system as in claim 33, wherein said sensor responsive to electromagnetic radiation is a bar code reader.

35. A method as in claim 13, wherein the step of entering a coded identifier includes reading electromagnetic radiation with a sensor responsive to electromagnetic radiation.

36. A method as in claim 35, wherein the step of entering a coded identifier includes reading electromagnetic radiation with a bar code reader.

37. A system as in claim 1, wherein said entering means for entering an identifier that identifies the transactor includes a sensor responsive to magnetic signals.

38. A system as in claim 37, wherein said sensor responsive to electromagnetic radiation is a smart card reader.

39. A method as in claim 13, wherein the step of entering a coded identifier includes reading magnetic signals with a sensor responsive to magnetic signals.

40. A method as in claim 39, wherein the step of entering a coded identifier includes reading magnetic signals from a smart card.

41. A system as in claim 1, wherein said identifier is carried on a credit or debit card.

42. A method as in claim 13, wherein the step of entering a coded identifier includes entering a credit or debit card.

43. A method as in claim 13, wherein the step of entering a coded identifier includes entering a card identifier.

44. A system as in claim 20, wherein the code reader is a card reader.

* * * * *